US008250574B2

(12) United States Patent
Baba

(10) Patent No.: US 8,250,574 B2
(45) Date of Patent: Aug. 21, 2012

(54) VIRTUAL MACHINE MANAGEMENT VIA USE OF TABLE IN WHICH VIRTUAL MACHINE INFORMATION IS REGISTERED ON A TIME BASIS

(75) Inventor: Teruyuki Baba, Tokyo (JP)

(73) Assignee: NEC Corporation, Tokyo (JP)

( * ) Notice: Subject to any disclaimer, the term of this patent is extended or adjusted under 35 U.S.C. 154(b) by 397 days.

(21) Appl. No.: 12/601,573

(22) PCT Filed: May 21, 2008

(86) PCT No.: PCT/JP2008/059345
§ 371 (c)(1),
(2), (4) Date: Nov. 24, 2009

(87) PCT Pub. No.: WO2008/146677
PCT Pub. Date: Dec. 4, 2008

(65) Prior Publication Data
US 2010/0175070 A1 Jul. 8, 2010

(30) Foreign Application Priority Data

May 24, 2007 (JP) .................................. 2007-137709

(51) Int. Cl.
*G06F 9/455* (2006.01)
(52) U.S. Cl. .......................................................... 718/1
(58) Field of Classification Search ........................ None
See application file for complete search history.

(56) References Cited

U.S. PATENT DOCUMENTS

| 6,006,248 | A  | * | 12/1999 | Nagae ........................... 718/105 |
| 6,748,414 | B1 | * | 6/2004  | Bournas ......................... 718/105 |
| 7,840,957 | B2 | * | 11/2010 | Kumashiro et al. ........... 717/173 |
| 7,890,689 | B2 | * | 2/2011  | Lam et al. ...................... 711/6   |
| 2007/0130566 | A1 | * | 6/2007  | van Rietschote et al. ......... 718/1 |
| 2007/0198656 | A1 | * | 8/2007  | Mazzaferri et al. ........... 709/218 |
| 2010/0275058 | A1 | * | 10/2010 | Hashimoto et al. ............... 714/8 |

FOREIGN PATENT DOCUMENTS

| JP | 2001265613 A | 9/2001 |
| JP | 2003162515 A | 6/2003 |
| JP | 2005115653 A | 4/2005 |
| JP | 2006244481 A | 9/2006 |
| JP | 2007004661 A | 1/2007 |

OTHER PUBLICATIONS

International Search Report for PCT/JP2008/059345 mailed Jul. 29, 2008.

* cited by examiner

*Primary Examiner* — Emerson Puente
*Assistant Examiner* — Gregory Kessler

(57) ABSTRACT

An object of the present invention is to suppress a variation in virtual machine startup times when multiple virtual machines are started in a computer system having multiple virtual machine providing servers. Execution server distribution unit 13 references a virtual machine status management table 32, which stores the status of virtual machine providing servers 90 in which virtual machines 91 are operating and the status of the virtual machines 91, and determines the positions of virtual machines in such a way that virtual machines, which execute specific processing (virtual machine startup, and so on) registered in a distributed processing specification table 31, are distributed. Operation server consolidation unit 16 references the virtual machine status management table 32 and determines the arrangement of the virtual machines 91 in such a way that virtual machines, which have executed the specific processing and are performing usual operations, are consolidated (FIG. 1).

4 Claims, 20 Drawing Sheets

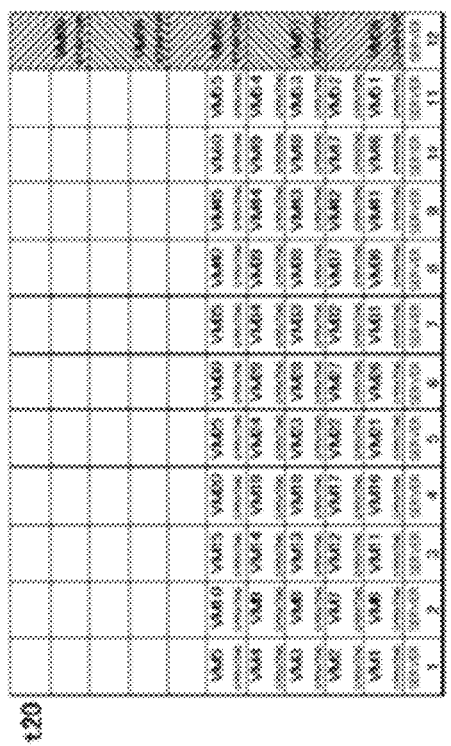
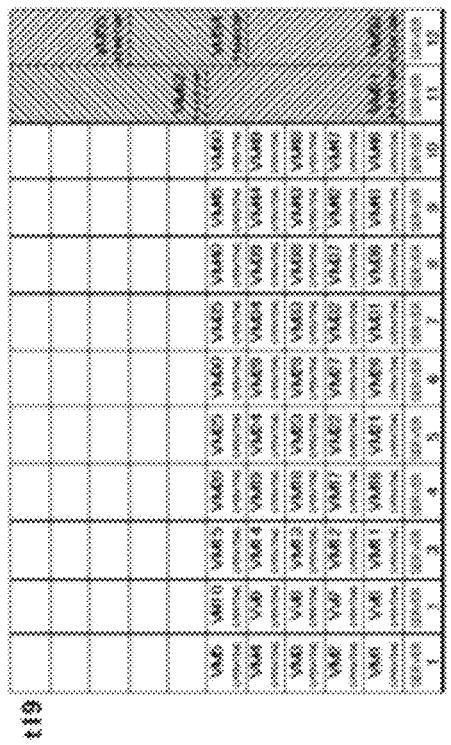
FIG. 8

FIG. 12

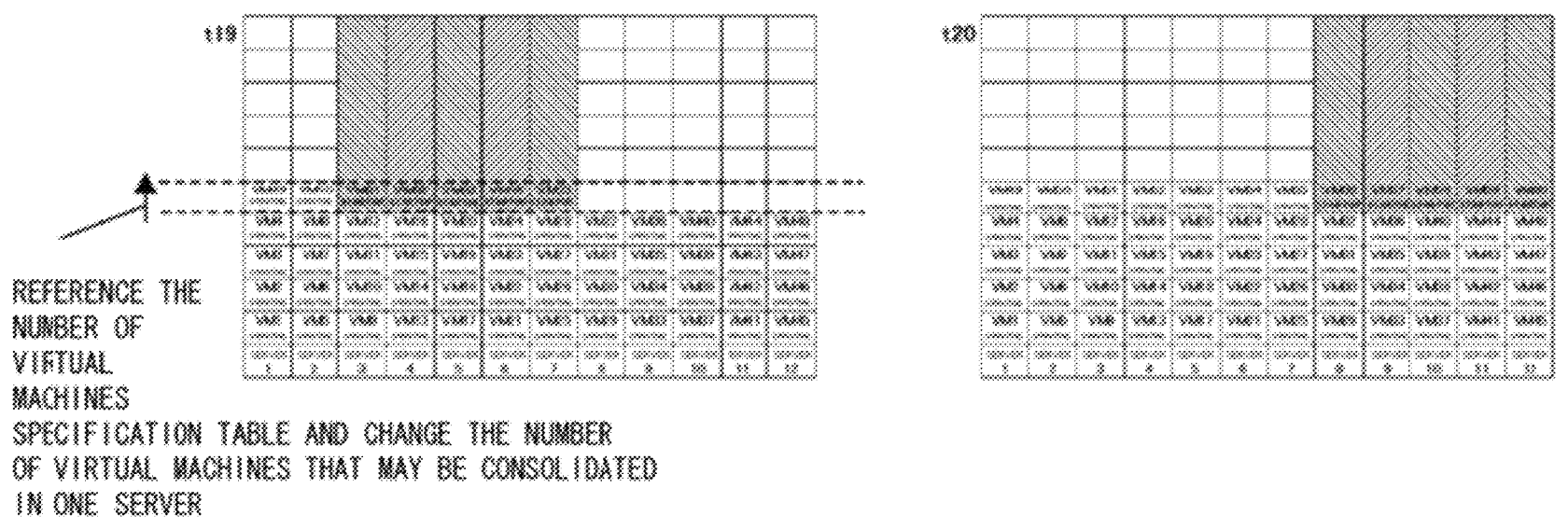

REFERENCE THE
NUMBER OF
VIRTUAL
MACHINES
SPECIFICATION TABLE AND CHANGE THE NUMBER
OF VIRTUAL MACHINES THAT MAY BE CONSOLIDATED
IN ONE SERVER

VIRTUAL MACHINE MANAGEMENT VIA USE OF TABLE IN WHICH VIRTUAL MACHINE INFORMATION IS REGISTERED ON A TIME BASIS

REFERENCE TO RELATED APPLICATION

The present application is the National Phase of PCT/JP2008/059345, filed May 21, 2008, which is based upon and claims priority from Japanese Patent Application 2007-137709 (filed on May 24, 2007) the content of which is hereby incorporated in its entirety by reference into this specification.

TECHNICAL FIELD

The present invention relates to a virtual machine managing device and a virtual machine managing method, and more particularly to a virtual machine managing device and a virtual machine managing method for use in a computer system in which multiple virtual machine providing servers are connected via a network.

BACKGROUND ART

Conventionally, the virtual machine (VM: Virtual Machine) technology is known that runs multiple operating systems (OS) on a single server (a computer such as a workstation or a personal computer) to allow users to virtually use one computer, as multiple computers. Among products that use this technology are VMWare ESX Server from VMware Inc., Virtual Server from Microsoft Corporation, and Xen from XenSource Inc. (U.S.). Those products allow the user to issue a VM generation command to start a new virtual machine on a server.

Another system using the virtual machine technology is a thin client system. A thin client system is a system in which the operation computers of multiple employees are consolidated into a virtual machine on a server, and the employees operate this virtual machine from terminals via a network. Using a high-performance computer for the routine jobs of company employees is inefficient and, so, the employee's computers are consolidated into a server as a virtual machine to increase the usage efficiency of computer resources. In addition, consolidating the job data used by the employees onto a server enhances security, for example, prevents information from being leaked.

For use in a computer system in which multiple servers are connected via a network, a still another technology is known in which a virtual machine, started on one server, is moved to another server. For example, VMware provides vMotion, and Xen provides 'migration' that is the virtual machine movement function.

When a new virtual machine is started in an environment in which multiple servers are dispersed, a method for selecting a server that has sufficient resources is employed as described in Patent Document 1. The technology disclosed in Patent Document 1 is that, based on the measurement data indicating the performance of existing virtual machines on a predetermined time basis, a combination of virtual machines and servers that maximize the total of the performance values of the virtual machines at each time is calculated, asynchronously with the start of a new virtual machine, when each virtual machine is run on one of multiple servers. And, the virtual machines are rearranged based on the calculated combination.

Patent Document 1:
Japanese Patent Kokai Publication No. JP-P2005-115653A

SUMMARY

The entire disclosure of Patent Documents 1 is incorporated herein by reference thereto. The following gives an analysis of the technology related to the present invention.

The method for selecting a server that has sufficient resources for starting a new virtual machine therein as described above has a problem that the startup times of the selected virtual machines depend largely on the amount of free resources the selected servers have. The following describes this problem more in detail with reference to FIG. 19.

Referring to FIG. 19, there are ten virtual machine providing servers 901. Virtual machine software 910 is installed in each virtual machine providing server 901 to enable multiple virtual machines 903 to be started. The following describes how the startup times of the virtual machines are estimated in this computer system assuming that a total of 50 virtual machines are started, five in each virtual machine providing server 901. In this calculation, the following conditions are assumed.

Assume that the startup time of each virtual machine is one minute when 100% of resources in the virtual machine providing server 901 are used. To a virtual machine that is started and in operation, 10% of server resources are allocated. When a virtual machine is started, all excess resources in a server are available for use. Excess resources refer to the resources except the amount of resources already allocated to the virtual machines in operation. When multiple virtual machines are started in the same virtual machine providing server 901, the excess resources are equally divided for use.

At this time, the startup time of each virtual machine is calculated as follows when virtual machine start requests are generated as shown in the pattern in FIG. 3. In FIG. 3, the horizontal axis indicates a time, and the vertical axis indicates the number of virtual machine start requests generated at that time. For example, the number of start requests is 2 at time t3, and the number of start requests is 5 at time t10.

When a start request is received in the computer system shown in FIG. 19, a virtual machine is started in a virtual machine providing server 901 in which the resource usage rate is low. Therefore, the virtual machines are created sequentially, one virtual machine at a time, in such a way that a first virtual machine 903-1 is created in a virtual machine providing server 901-1, a next virtual machine 903-2 is created in a virtual machine providing server 901-2, and so on. After a virtual machine 903-10 is created in a virtual machine providing server 901-10, virtual machines are created in all virtual machine providing servers 901, one for each. To create a next virtual machine 903-11, control is passed back to the virtual machine providing server 901-1. In this way, virtual machines are created in the computer system shown in FIG. 19 such that the number of virtual machines is equal among the virtual machine providing servers 901.

The startup times of the virtual machines 903 are those shown in Tables 921 in FIG. 19. From the virtual machine 903-1 to the virtual machine 903-10, the startup time is one minute because 100% of the resources of the virtual machine providing server 901 may be used. From the virtual machine 903-11 to the virtual machine 903-20, 90% of the resources of the virtual machine providing server 901 are used because one virtual machine is already in operation. Therefore, the startup time is (1/0.9) minutes. Similarly, from the virtual machine 903-41 to the virtual machine 903-50, 60% of the resources of the virtual machine providing server 901 are used because four virtual machines 903 are already in operation. Therefore, the startup time is (1/0.6) minutes. FIG. 20 shows the distribution of virtual machine startup times calculated in this way.

In the computer system shown in FIG. 19, the resources of multiple virtual machine providing servers 901 are equally used and free resources are distributed among those virtual machine providing servers. Therefore, in the example given above, the startup time of 60% of virtual machines is 1.2 times longer than that when there is no load.

Not only in a virtual machine but also in a general computer, a variation or a delay in the startup time, which irritates the user, should be minimized.

It is an object of the present invention to provide a virtual machine managing device and method that reduce a variation in the processing time of the processing, for example, the startup processing of a virtual machine, that increases the load temporarily.

According to a first aspect of the present invention, there is provided a virtual machine managing device for use in a computer system in which multiple virtual machine providing servers each of which operate virtual machines are interconnected via a network. This virtual machine managing device comprises virtual machine status management unit, for example, a virtual machine status management table, that manages the load status of virtual machine providing servers. This virtual machine managing device further comprises execution server distribution unit that references data, managed by the virtual machine status management unit, for example, the virtual machine status management table, and distributes predefined specific processing among low-load virtual machine providing servers for execution. This virtual machine managing device further comprises operation server consolidation unit that references data, managed by the virtual machine status management unit, for example, the virtual machine status management table, and moves virtual machines, which have terminated the specific processing, to separate the virtual machine providing servers into virtual machine providing servers, in which many virtual machines are consolidated, and other virtual machine providing servers in which a few virtual machines are included. That is, the operation server consolidation unit moves virtual machines, which have terminated the specific processing, to other virtual machine providing servers in such a way that the virtual machine providing servers are separated into virtual machine providing servers in which many virtual machines are consolidated and other virtual machine providing servers (in which there are a fewer virtual machines).

According to a second aspect of the present invention, there is provided a virtual machine managing method for use in a computer system in which multiple virtual machine providing servers each of which operate virtual machines are interconnected via a network. The virtual machine managing method comprises an execution server distribution step in which data stored in virtual machine status management unit, in which load status of virtual machine providing servers is stored, is referenced and predefined specific processing is distributed among low-load virtual machine providing servers for execution; and an operation server consolidation step in which virtual machines, which have terminated the specific processing, are moved (to other virtual machine providing servers) for separating the virtual machine providing servers into virtual machine providing servers, in which many virtual machines are consolidated, and other virtual machine providing servers.

According to a third aspect of the present invention, there is provided a virtual machine managing program causing a computer, which configures a virtual machine managing device for use in a computer system in which multiple virtual machine providing servers, each operating virtual machines therein, are interconnected via a network, to function as execution server distribution unit that references data, stored in virtual machine status management unit in which the load status of the virtual machine providing servers is stored, and distributes predefined specific processing among low-load virtual machine providing servers for execution; and operation server consolidation unit that references data, stored in the virtual machine status management unit, and moves virtual machines, which have terminated the specific processing, (to other virtual machine providing servers) for separating the virtual machine providing servers into virtual machine providing servers, in which many virtual machines are consolidated, and other virtual machine providing servers in which a few virtual machine providing servers are included.

Although the example of the special processing is the startup of a virtual machine in the above description, the special processing is not limited to it.

The present invention suppresses a variation in the processing times of special processing, such as the startup of a virtual machine, that temporarily increases the load. The reason is that virtual machines, which have terminated the specific processing, are moved for separating the virtual machine providing servers into virtual machine providing servers, in which many virtual machines are consolidated, and virtual machine providing servers in which a few virtual machines are included so that the special processing, which will be generated later, is executed preferably in a virtual machine providing server in which there is no or a few virtual machines.

BRIEF DESCRIPTION OF THE DRAWINGS

FIG. 8 is a diagram showing in detail the operation of the first exemplary embodiment of the present invention.

FIG. 12 is a diagram showing in detail the operation of the second exemplary embodiment of the present invention.

Explanations of symbols are given in the text.

PREFERRED MODES

Next, exemplary embodiments of the present invention will be described more in detail with reference to the drawings.

First Exemplary Embodiment

Figure 1:
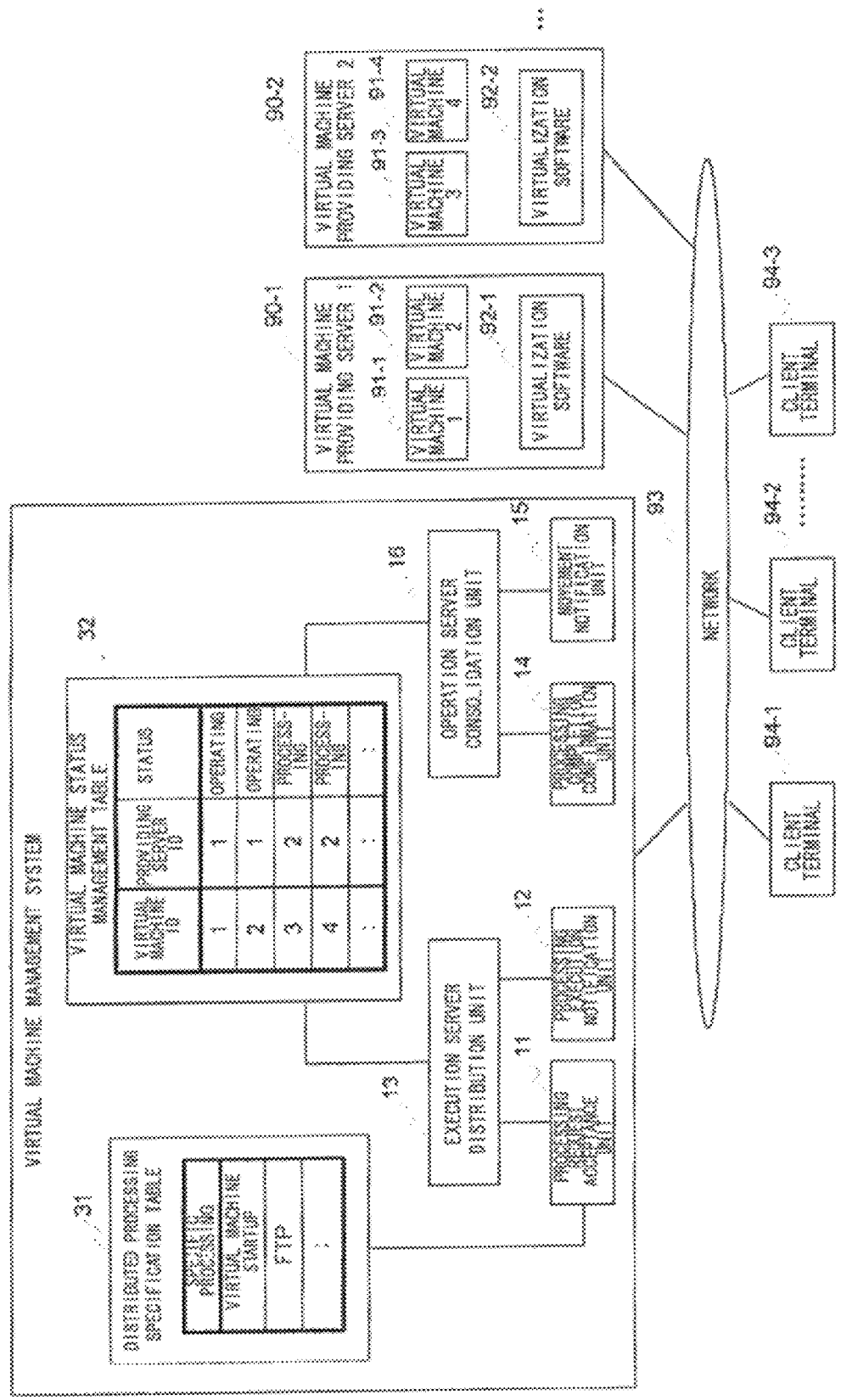
FIG. 1 is a block diagram showing the configuration of a first exemplary embodiment of the present invention.

Referring to FIG. 1, a computer system in a first exemplary embodiment of the present invention comprises a virtual machine management system 1, multiple virtual machine providing servers 90, and multiple client terminals 94, all interconnected via a network 93.

Each virtual machine providing server 90 comprises virtual machines 91 and virtualization software 92.

The virtual machine management system 1 comprises a distributed processing specification table 31 that specifies specific processing to be executed in a distributed manner, processing request acceptance unit 11 that accepts a processing request from the client terminals 94 and checks if the requested processing is specific processing, execution server distribution unit 13 that determines an execution server in such a way that the virtual machines 91 that execute specific processing are distributed, processing execution notification unit 12 that notifies the virtual machine 91 or virtualization software 92 of a processing execution instruction, a virtual machine status management table 32 that manages the status of the virtual machine providing servers 90 where the virtual machines 91 are operating and the status of the virtual machines 91, operation server consolidation unit 16 that determines the arrangement of the virtual machines 91 in such a way that the virtual machines that have executed specific processing and are operating usual operation are consolidated, processing completion confirmation unit 14 that confirms that specific processing in the virtual machine 91 is completed, and movement notification unit 15 that sends a virtual machine movement instruction to the virtualization software 92.

The distributed processing specification table 31 stores specific processing to be executed in a distributed manner. Specific processing to be processed in a distributed manner is processing that temporarily increases the amount of processing, such as the startup of a virtual machine and the execution of FTP (File Transfer Protocol) as shown in FIG. 1. Specific processing also includes batch processing that collects a large amount of data for processing on a scheduled basis, for example, virus checking, data backup, log analysis, and sales data or order data collection processing in a company.

The processing request acceptance unit 11 accepts a processing request from the client terminals 94 and, by referencing the distributed processing specification table 31, determines if the requested processing is specific processing to be processed in a distributed manner.

The virtual machine status management table 32 stores the status of the virtual machine providing servers 90 in which the virtual machines 91 are operating and the status of the virtual machines 91. As shown in FIG. 1, "Operating", "Processing (specified processing is being executed)", and so on are registered as the status. Other statuses registered in this table are the relation indicating to which virtual machine providing server a virtual machine belongs and information whether or not the virtual machine is executing specific processing, and those statuses may be registered. Those statuses may be registered using multiple tables, if necessary.

The execution server distribution unit 13 references the virtual machine status management table 32 to determine an execution server (virtual machine providing server 90 that executes the specific processing) so that the virtual machines 91, which execute specific processing, are distributed.

The processing execution notification unit 12 sends a specific processing execution instruction to the virtual machine providing server 90 determined by the execution server distribution unit 13.

The processing completion confirmation unit 14 confirms that the virtual machine 91 has completed specific processing. To confirm that processing is completed, software must be run in the virtual machine 91 for monitoring the processing in the virtual machine 91 and, upon completion of the processing, notifying the virtual machine management system 1 that the processing is completed. When the specific processing is the startup of a virtual machine, another method is that the virtualization software 92 notifies the virtual machine management system 1 that the startup of the virtual machines 91 is completed.

The operation server consolidation unit 16 determines the arrangement of the virtual machines 91 so that the virtual machines that have executed specific processing and are performing the usual operation are consolidated. One method for determining the arrangement is that the operation server consolidation unit 16 references the virtual machine status management table 32 and moves a virtual machine, which has terminated specific processing, to a virtual machine providing server, in which the number of virtual machines has not yet reached a predetermined maximum number, to maximize the number of virtual machine providing servers in which there is no virtual machine. Another method for determining the arrangement is that, with the resource usage rate for each virtual machines 91 stored in the virtual machine status management table 32, the operation server consolidation unit 16 moves a virtual machine, which has terminated specific processing, to a virtual machine providing server, in which the resource usage rate has not reached the maximum, to maximize the number of virtual machine providing servers in which there is no virtual machine. This is done within a range of the maximum resource value determined for each virtual machine providing server.

The movement notification unit 15 sends a virtual machine movement instruction to the virtualization software 92 according to the arrangement of virtual machines determined by the operation server consolidation unit 16.

Figure 2:
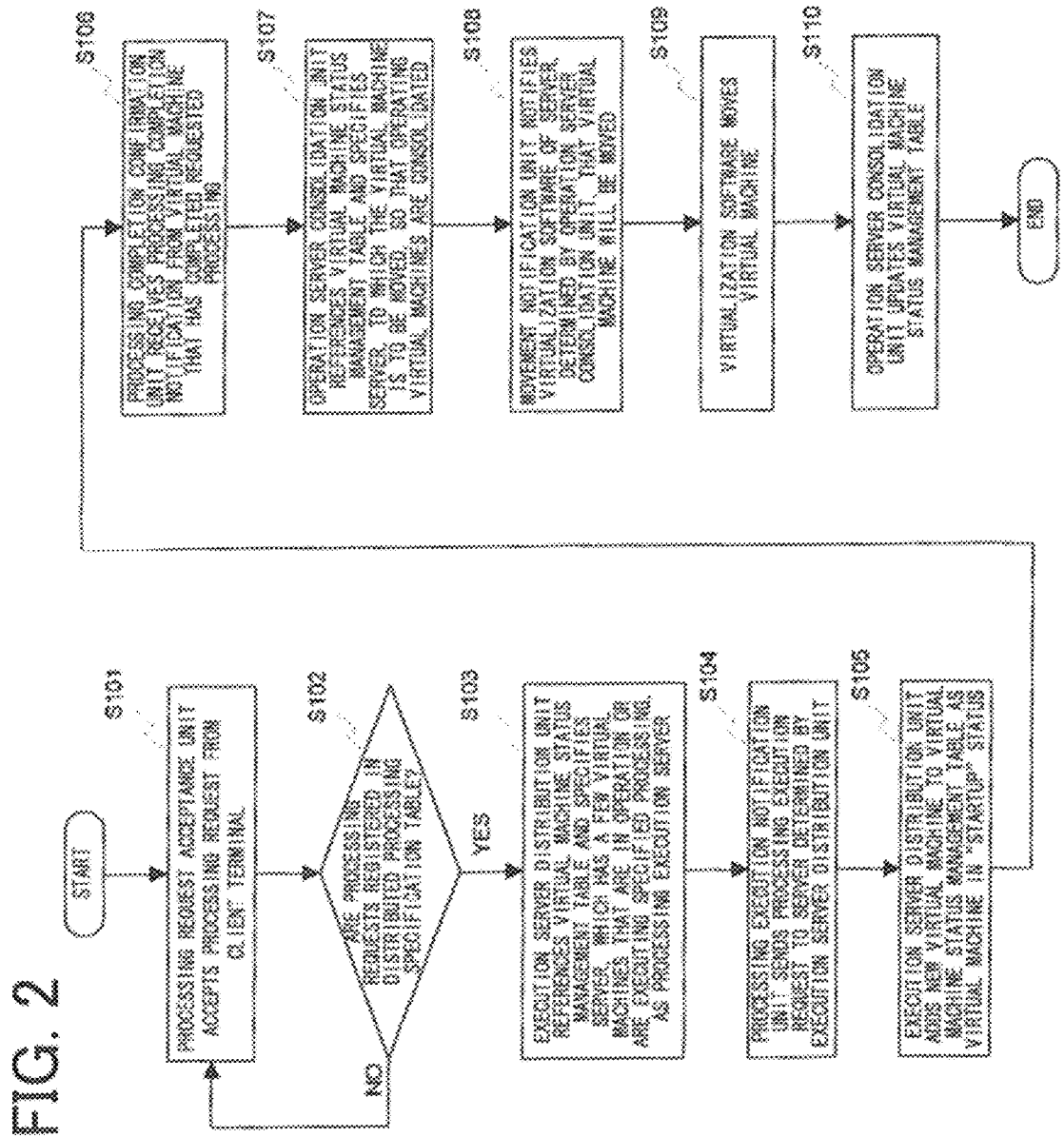
FIG. 2 is a flowchart showing the operation of the first exemplary embodiment of the present invention.

Next, with reference to the flowchart in FIG. 2, the following describes in detail the operation of this exemplary embodiment when a processing request for starting a virtual machine is generated from the client terminal 94.

First, in step S101, the processing request acceptance unit 11 accepts a processing request from the client terminal 94.

Next, in step S102, the processing request acceptance unit 11 checks if the accepted processing request is registered in the distributed processing specification table 31. If the processing specified by the processing request is registered in the distributed processing specification table 31, the step S103 and the following steps are executed. Because the distributed processing specification table 31 in FIG. 1 stores "virtual machine startup" as specific processing, the step S103 and the following steps are executed. If the processing specified by the processing request is not registered in the distributed processing specification table 31, any processing method may be used and, so, the description is omitted here because the processing in that case is not related directly to the present invention.

Next, in step S103, the execution server distribution unit 13 references the virtual machine status management table 32 and specifies the virtual machine providing server 90, which has a fewer virtual machines that are in operation or are executing specified processing, as a processing execution server. Another method for implementing this processing is that, with the resource usage amount of virtual machines registered in the virtual machine status management table 32, the execution server distribution unit 13 selects a server, which has a smaller resource usage amount, in step S103. In this case, the execution server distribution unit 13 selects the arrangement of virtual machines so that neither the predetermined number of virtual machines nor the maximum resource usage amount is exceeded.

Next, in step S104, the processing execution notification unit 12 sends a processing execution request to the server, determined by the execution server distribution unit 13, via the network 93. In the virtual machine providing server 90 to which the processing execution request is sent, the processing of generating a new virtual machine 91 is started under control of the virtualization software 92.

Next, in step S105, the execution server distribution unit 13 adds the new virtual machine to the virtual machine status management table 32 as a virtual machine in the "Startup" status.

Next, in step S106, the processing completion confirmation unit 14 receives a processing completion notification from the virtual machine 91 that has completed the requested processing. In response to this notification, the operation server consolidation unit 16 updates the virtual machine status management table 32 to change the status of the new virtual machine, which has been in "Startup", to "Operating".

Next, in step S107, the operation server consolidation unit 16 references the virtual machine status management table 32 and specifies a server, to which the virtual machine 91 is to be moved, so that the operating virtual machines 91 are consolidated.

Next, in step S108, the movement notification unit 15 notifies the virtualization software 92 of the server, determined by the operation server consolidation unit 16, that the virtual machine will be moved.

Next, in step S109, the virtualization software 92 moves the specified virtual machine 91.

Finally, in step S110, the operation server consolidation unit 16 updates the virtual machine status management table 32 according to the movement of the virtual machine 91.

Figure 3:
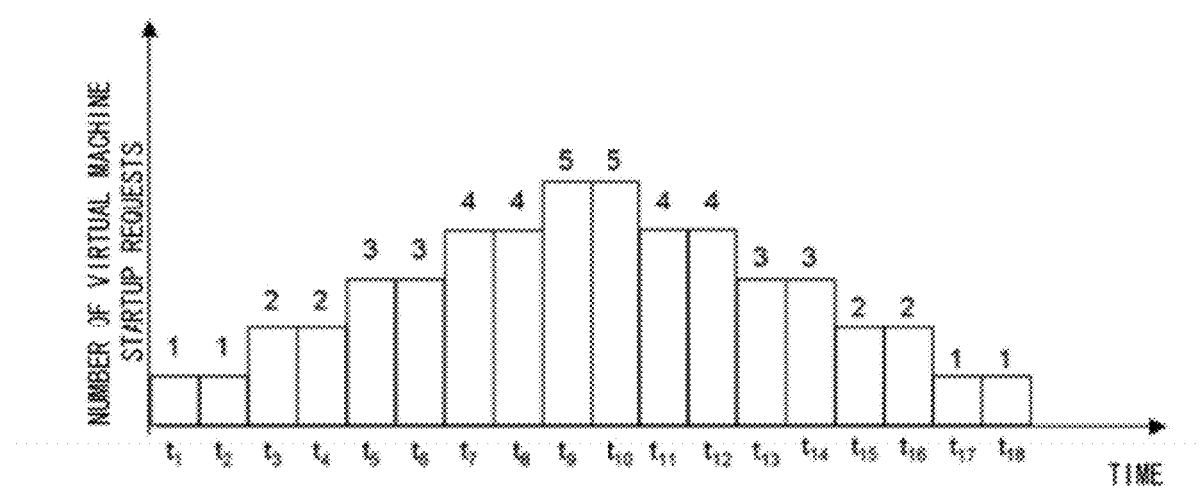
FIG. 3 is a diagram showing an example of a virtual machine startup pattern.
Figure 4:
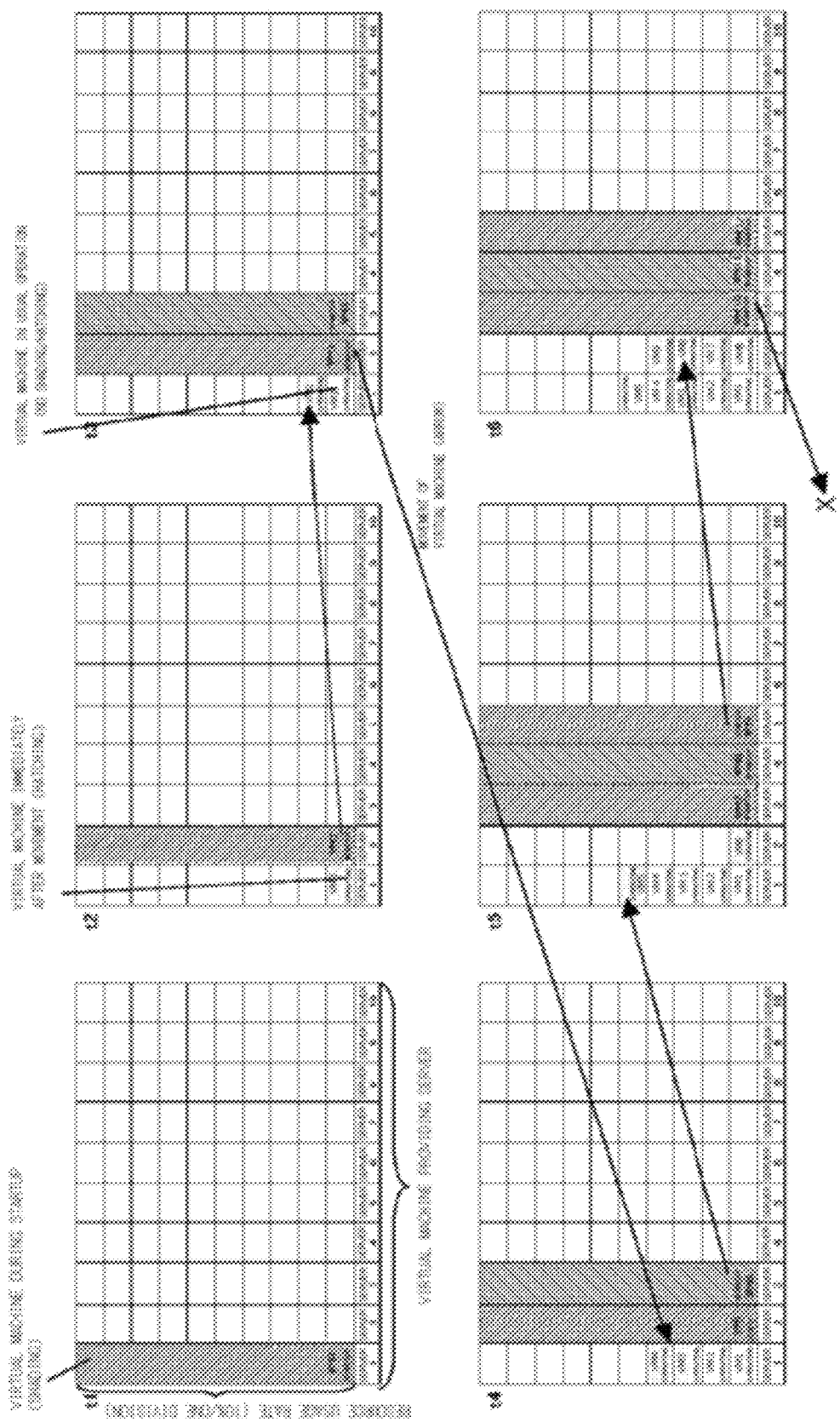
FIG. 4 is a diagram showing in detail the operation of the first exemplary embodiment of the present invention.
Figure 5:
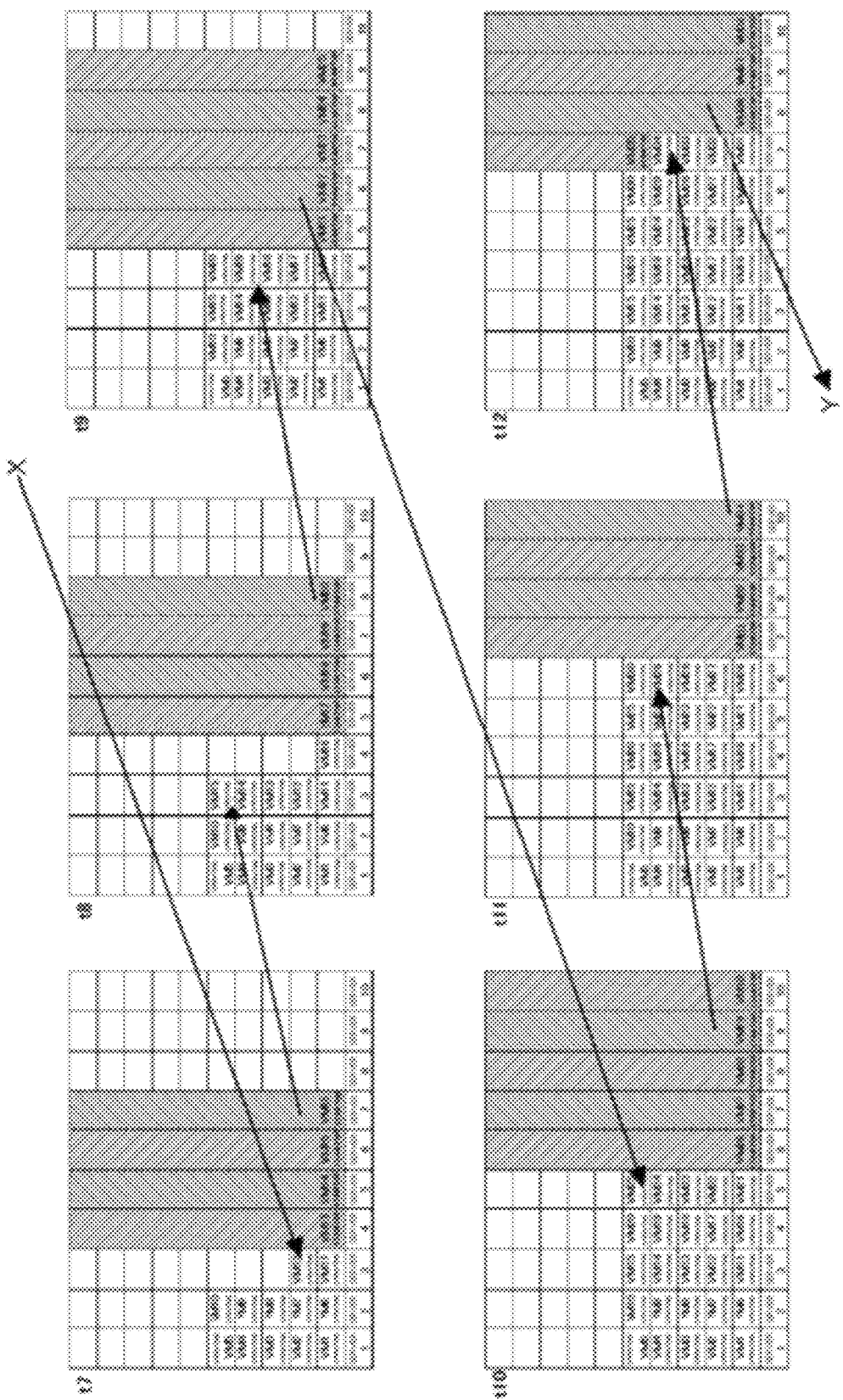
FIG. 5 is a diagram showing in detail the operation of the first exemplary embodiment of the present invention.
Figure 6:
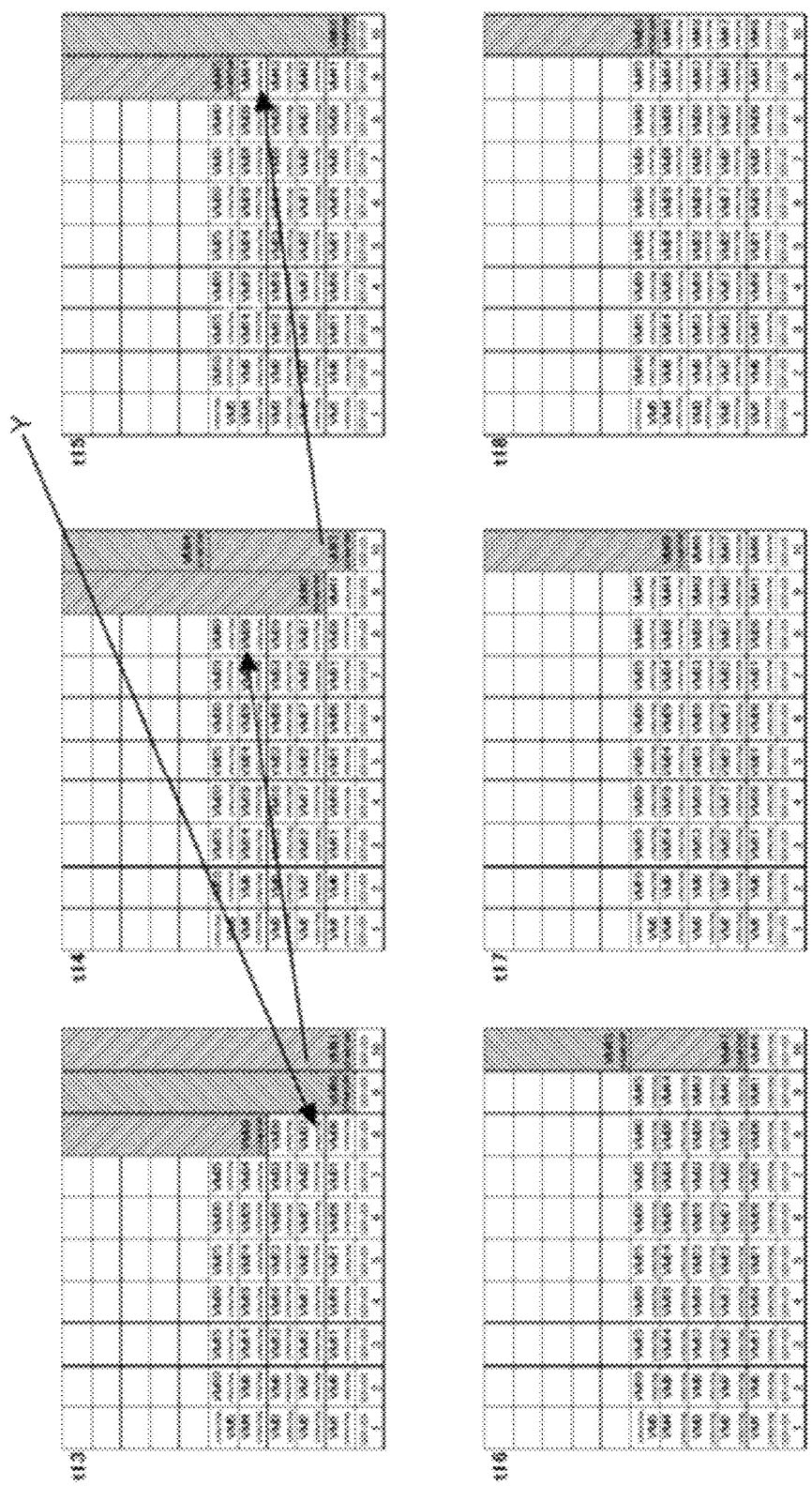
FIG. 6 is a diagram showing in detail the operation of the first exemplary embodiment of the present invention.

Next, referring to FIG. 4 to FIG. 6, the following describes, more in detail, the operation of the first exemplary embodiment of the present invention that is executed when virtual machine startup requests are issued as shown in the virtual machine startup request pattern in FIG. 3 used for describing the problems to be solved by the invention.

FIG. 4 to FIG. 6 show the virtual machines 91 in the virtual machine providing servers 90 and the amount of resources allocated to each virtual machine 91 at each time (t1-t18). The horizontal axis indicates the virtual machine providing servers 90. The vertical axis indicates the usage rate of resources used by the virtual machines 91. It is assumed that the maximum resource usage amount of each virtual machine providing server 90 is the amount of resources equivalent to the amount of resources used by five virtual machines.

In step S101, the processing request acceptance unit 11 accepts a request to start one virtual machine at time t1 in the startup request pattern shown in FIG. 3.

In step S102, the processing request acceptance unit 11 references the distributed processing specification table 31, finds that "virtual machine startup" is registered as the specific processing, and so determines that step S103 and the following steps will be executed.

In step S103, the execution server distribution unit 13 selects, at time t1, the virtual machine providing server 90-1 as a virtual machine providing server that has the smallest number of virtual machines. Because there is no virtual machine in any of the virtual machine providing servers at time t1, any virtual machine providing server may be selected. In the description below, it is assumed that the virtual machine providing servers 90-1 is selected.

In step S104, the processing execution notification unit 12 notifies the virtual machine providing server 90-1 that a virtual machine 91-1 will be started therein.

In step S105, the execution server distribution unit 13 registers the status, which indicates that the virtual machine 91-1 is being started in the virtual machine providing server 90-1, in the virtual machine status management table 32. In response to the processing execution notification, the virtual machine providing servers 90-1 starts the virtual machine 91-1. At this time, as shown in the virtual machine providing server usage status at t1 in FIG. 4 to FIG. 6, the virtual machine 91-1 uses 100% of the resources of the virtual machine providing servers 90-1.

In step S106, virtualization software 92-1 of the virtual machine providing server 90-1 notifies the processing completion confirmation unit 14, at time t1, that the startup of the virtual machine 91-1 is completed.

In step S107, because there is a virtual machine only in the virtual machine providing server 90-1 at time t1, the operation server consolidation unit 16 determines the arrangement of virtual machines such that the virtual machines are consolidated in the virtual machine providing server 90-1. At time t1, the virtual machine 91-1 is already operating in the virtual machine providing server 90-1 and so no movement request is generated.

In step S108, no movement notification is issued because the operation server consolidation unit 16 does not generate a virtual machine movement request at time t1.

In step S109, no virtual machine is moved because the operation server consolidation unit 16 does not generate a virtual machine movement request at time t1.

In step S110, at time t1, the operation server consolidation unit 16 registers the status, which indicates that the virtual machine 91-1 is operating in the virtual machine providing server 90-1, in the virtual machine status management table 32.

Next, the following describes the operation at time t2 with reference to the resource usage rates of the virtual machine providing servers in FIG. 4 to FIG. 6.

In step S101, the processing request acceptance unit 11 accepts a request for starting one virtual machine at time t2 shown in the startup request pattern in FIG. 3.

In step S102, the processing request acceptance unit 11 references the distributed processing specification table 31 and determines that steps S103 and the following steps will be executed because "virtual machine startup" is registered as the special processing.

In step S103, the execution server distribution unit 13 selects, at time t2, the virtual machine providing server 90-2 as a virtual machine providing server that has the smallest number of virtual machines. At time t2, the virtual machine 91-1 is in the virtual machine providing server 90-1 and so the execution server distribution unit 13 selects the virtual machine providing server 90-2 having a fewer virtual machines. Although any virtual machine providing server other than the virtual machine providing server 90-1 may be selected, it is assumed in the description below that the virtual machine providing server 90-2 is selected.

In step S104, the processing execution notification unit 12 notifies the virtual machine providing server 90-2 that a virtual machine 91-2 will be started therein.

In step S105, the execution server distribution unit 13 registers the status, which indicates that the virtual machine 91-2 is being started in the virtual machine providing server 90-2, in the virtual machine status management table 32. In response to the processing execution notification, the virtual machine providing server 90-2 starts the virtual machine 91-2. At this time, as shown in the virtual machine providing server usage status at t2 in FIG. 4 to FIG. 6, the virtual machine 91-2 uses 100% of the resources of the virtual machine providing servers 90-2.

In step S106, virtualization software 92-2 of the virtual machine providing server 90-2 notifies the processing completion confirmation unit 14, at time t2, that the startup of the virtual machine 91-2 is completed.

In step S107, the operation server consolidation unit 16 references the virtual machine status management table 32 at time t2 and finds that the virtual machine 91-1 is operating in the virtual machine providing server 90-1 and that the virtual machine 91-2 is being started in the virtual machine providing server 90-2. The operation server consolidation unit 16, which determines the arrangement of virtual machines such that the virtual machines that have been started and are in usual operation are consolidated into a virtual machine providing server that has a fewer virtual machines, determines that, at time t2, the virtual machine 91-2 should be moved from the virtual machine providing server 90-2 to the virtual machine providing server 90-1.

In step S108, to move the virtual machine 91-2, determined by the operation server consolidation unit 16 in step S107, from the virtual machine providing server 90-2 to the virtual machine providing server 90-1, the movement notification unit 15 sends the movement instruction, which moves the virtual machine 91-2, to the virtual machine providing server 90-1 and the virtual machine providing server 90-2.

In step S109, the virtualization software 92-1 and virtualization software 92-2 of the virtual machine providing server 90-1 and the virtual machine providing server 90-2 work together to move the virtual machine 91-2. In FIG. 4 to FIG. 6, this movement is indicated by the arrow.

Finally, in step S110, the operation server consolidation unit 16 updates the status of the virtual machine 91-2 in the virtual machine status management table 32 to the status indicating that the virtual machine 91-2 is operating in the virtual machine providing server 90-1.

For use in moving a virtual machine, the technologies, such as Vmotion of VMWare and Live migration of Xen, are provided to allow a virtual machine to be moved without stopping the service. Those technologies make it possible for the service to be supplied to the user immediately after starting a virtual machine, thus allowing the virtual machine service to be supplied without concerning about the virtual machine movement time.

In addition, if the movement of a virtual machine started at time ti is completed before the next time ti+1, a virtual machine may be started immediately at the next time ti+1. For example, in FIG. 4 to FIG. 6, if the movement of the virtual machine 91-2, which was started in the virtual machine providing server 90-2 at time t2, to the virtual machine providing server 90-1 is completed before time t3, a virtual machine 91-3 may be started immediately in the virtual machine providing server 90-2 according to a virtual machine request accepted at time t3.

At and after time t3, steps S101 to S110 are repeated for a virtual machine start request in the same way as at t1 and t2 described above. FIG. 4-FIG. 6 show the relation between the virtual machine providing servers and the virtual machines from t1 to t18.

At t1 and t2, a startup request for one virtual machine is issued. When two or more virtual machine requests are accepted as at time t3, the virtual machines are started in as many different virtual machine providing servers as possible in step S103 to increase the amount of resources that may be used at startup time. For example, the number of requests is two at time t3 in the request pattern shown in FIG. 3. In this case, the arrangement of virtual machines is as shown in the virtual machine providing server usage status table (t3) in FIG. 4-FIG. 6; that is, the virtual machine 91-3 is started in the virtual machine providing server 90-2 and a virtual machine 91-4 is started in a virtual machine providing server 90-3. In addition, when the virtual machine 91-3 and 91-4 are started and are in the operating status, the operation server consolidation unit 16 specifies in step S107 that those virtual machines be moved to the virtual machine providing server 90-1.

Figure 7:
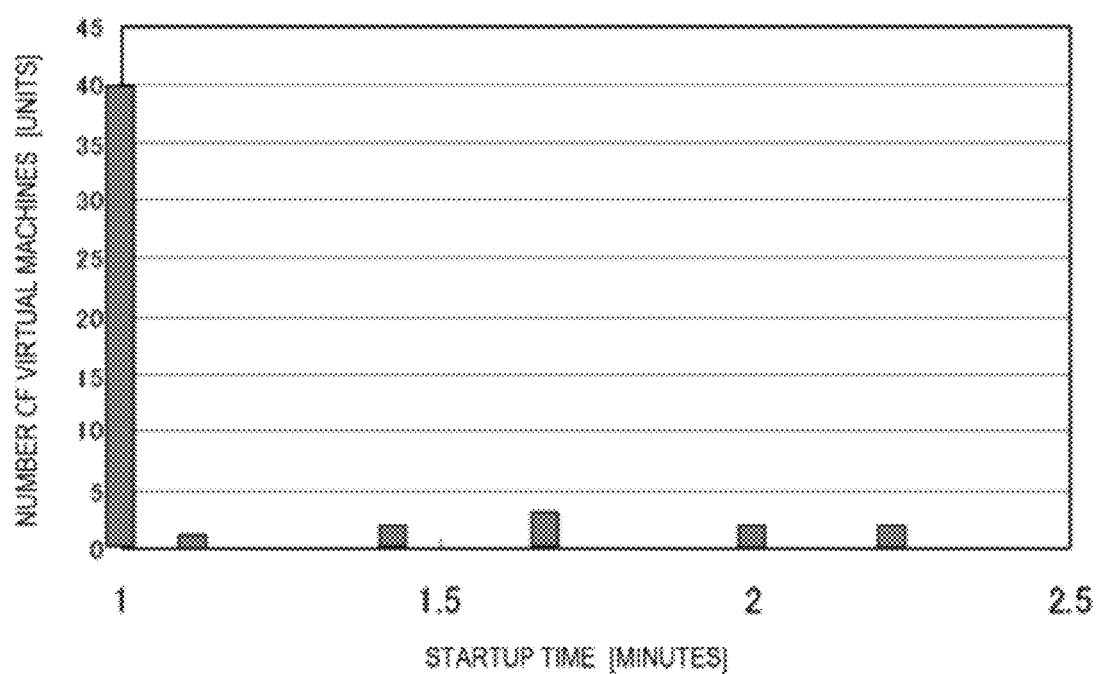
FIG. 7 is a diagram showing an example of the startup time distribution of virtual machines when the first exemplary embodiment of the present invention is used.

From the relation between the virtual machine providing servers and the virtual machines shown in FIG. 4 to FIG. 6, the startup times of the virtual machines are calculated based on the amount of recourses available for use at virtual machine startup time. FIG. 7 shows the distribution of the calculated virtual machine startup times. The startup time of a virtual machine is calculated assuming that the startup time is one minute when 100% of resources may be used and that the startup time is inversely proportional to the amount of available resources. For example, at time t13, the startup time of a virtual machine 91-39 is calculated as 1/0.7=1.43 (minutes) because 70% of the resources are available.

Figure 20:
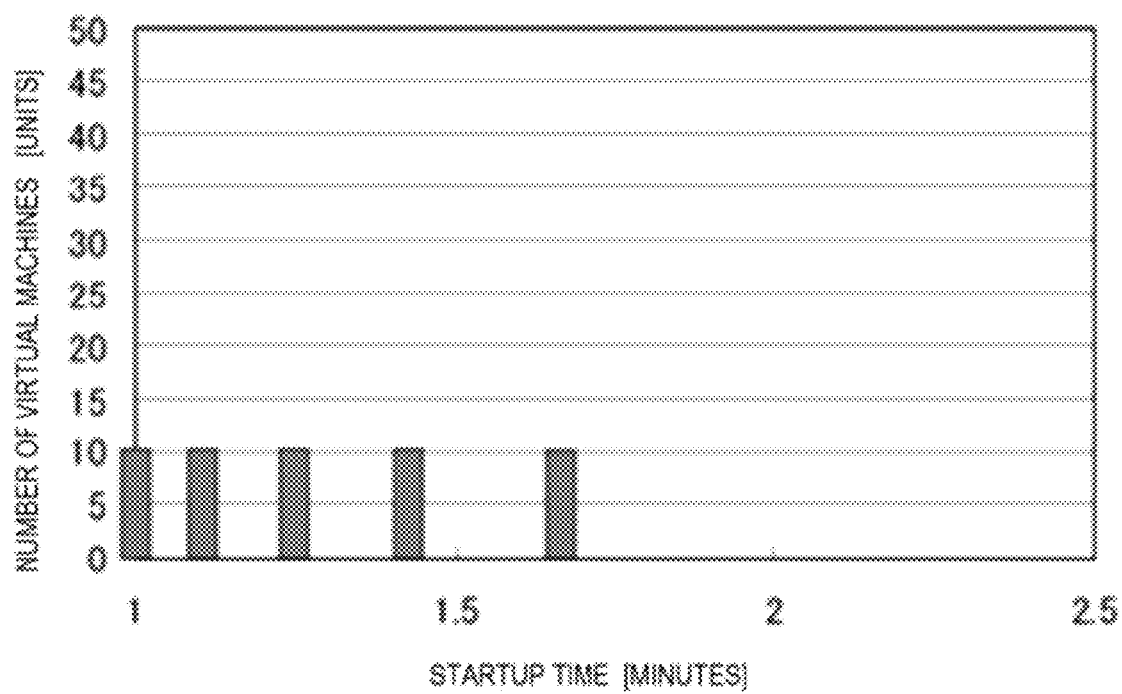
FIG. 20 is a diagram showing an example of the startup time distribution of virtual machines when the technology related to the present invention is used.

The distribution of virtual machine startup times in this exemplary embodiment shown in FIG. 7 indicates that the average of the virtual machine startup times is reduced and that the number of virtual machines, which are started in one minute (the optimum value achieved when 100% of the resources of a virtual machine providing server are available), is larger than the number indicated by the result of the related technology shown in FIG. 20. In addition, the average startup time of all virtual machines is shorter than that of the related technology shown in FIG. 20.

As described above, when special processing, such as virtual machine startup, that temporarily increases the processing load is executed in multiple virtual machines at the same time, the operation server consolidation unit 16 consolidates the virtual machines, which have terminated the special processing and are executing the usual operation, for consolidating free resources. To efficiently use the consolidated free resources, the execution server distribution unit 13 distributes virtual machines, which will execute the special processing, among virtual machine providing servers each having free resources, thus suppressing a variation in virtual machine startup times.

Although the virtual machines are consolidated in the above description, consolidating virtual machines is equivalent to consolidating free resources. Therefore, it is also understood that the operation server consolidation unit 16 consolidates free resources.

In the above description, "virtual machine startup" is the special processing in which the execution server distribution unit 13 distributes the processing among the virtual machine providing servers. To achieve the effect of the present invention, free resources are consolidated for the processing that will temporarily increase the load and, when the special processing is executed, the execution server distribution unit 13 executes the processing in a distributed manner and, so, the special processing is not limited to the virtual machine startup described above but may be any processing that will temporarily increase the load. In this embodiment, FTP (File Transfer Protocol) is used as another example of such processing.

When the special processing is FTP, a virtual machine that executes the FTP processing is moved to a virtual machine providing server with a lower load and, after the execution of FTP, the virtual machines are consolidated. For example, assume that two FTP requests are generated when four virtual machines 91-1 to 91-4, including the virtual machines 91-3 and 91-4 started at time t3 in FIG. 4 to FIG. 6, are consolidated in the virtual machine providing server 90-1. In this case, first FTP processing is assigned, for example, to the virtual machine 91-3, second FTP processing is assigned to the virtual machine 91-4, the virtual machine 91-3 is moved, for example, to virtual machine providing server 90-2 for executing the FTP processing therein, and the virtual machine 91-4 is moved, for example, to the virtual machine providing server 90-3 for executing the FTP processing therein. After the FTP processing is terminated, the virtual machines 91-3 and 91-4 are consolidated again into the virtual machine providing server 90-1.

The maximum of the resources used by each virtual machine providing server, though specified by the number of virtual machines in the above description, may be specified by another method. For example, the maximum of the resource usage rate of a virtual machine providing server may also be specified. Specifying the resource usage rates in this way prevents the amount of resources used by the virtual machine providing servers from becoming uneven even when the allowable resource amount varies from virtual machine to virtual machine.

Second Exemplary Embodiment

Next, a second exemplary embodiment of the present invention will be described in detail with reference to the drawings.

Figure 9:
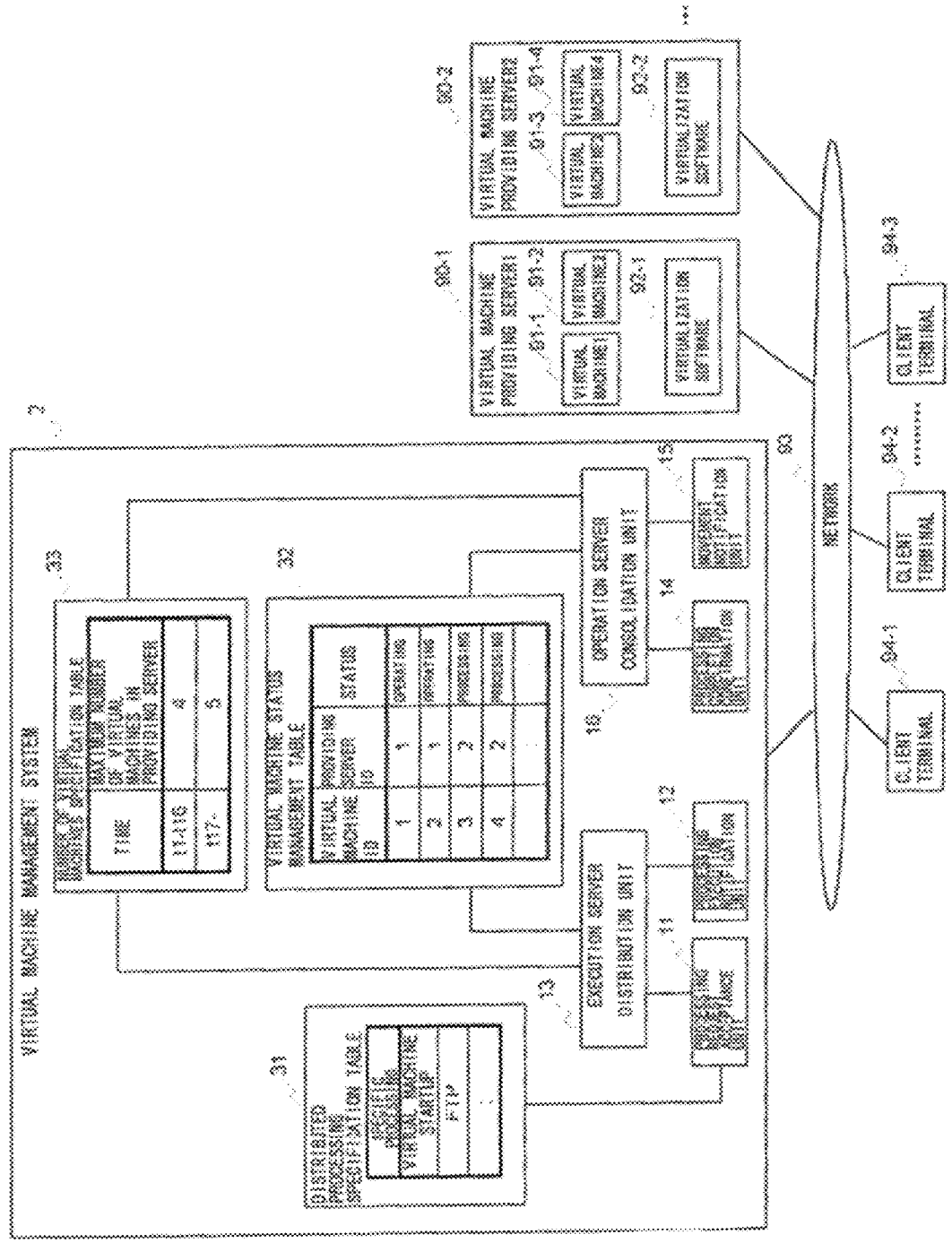
FIG. 9 is a block diagram showing the configuration of a second exemplary embodiment of the present invention.

Referring to FIG. 9, a computer system in the second exemplary embodiment of the present invention differs from the computer system in the first exemplary embodiment shown in FIG. 1 in that the virtual machine management system 1 is replaced by a virtual machine management system 2. In addition, the virtual machine management system 2 differs from the virtual machine management system 1 in that it further comprises a number of virtual machines specification table 33.

The number of virtual machines specification table 33 is a table in which the maximum number of virtual machines that may be created in the virtual machine providing servers 90 at each time are registered. The number of virtual machines specification table 33 in FIG. 9 indicates that up to four virtual machines may be created in each virtual machine providing server 90 from time t1 to t16, and up to five virtual machines in each virtual machine providing server at and after t17. The number of virtual machines specification table 33 indicates the maximum number of virtual machines that may be consolidated when the operation server consolidation unit 16 consolidates virtual machines. The maximum number of virtual machines to be registered at each time is determined in advance based on the processing request pattern at each of the times. In this exemplary embodiment, any determination method may be used. In a third exemplary embodiment that will be described later, the determination is automatic.

Figure 10:
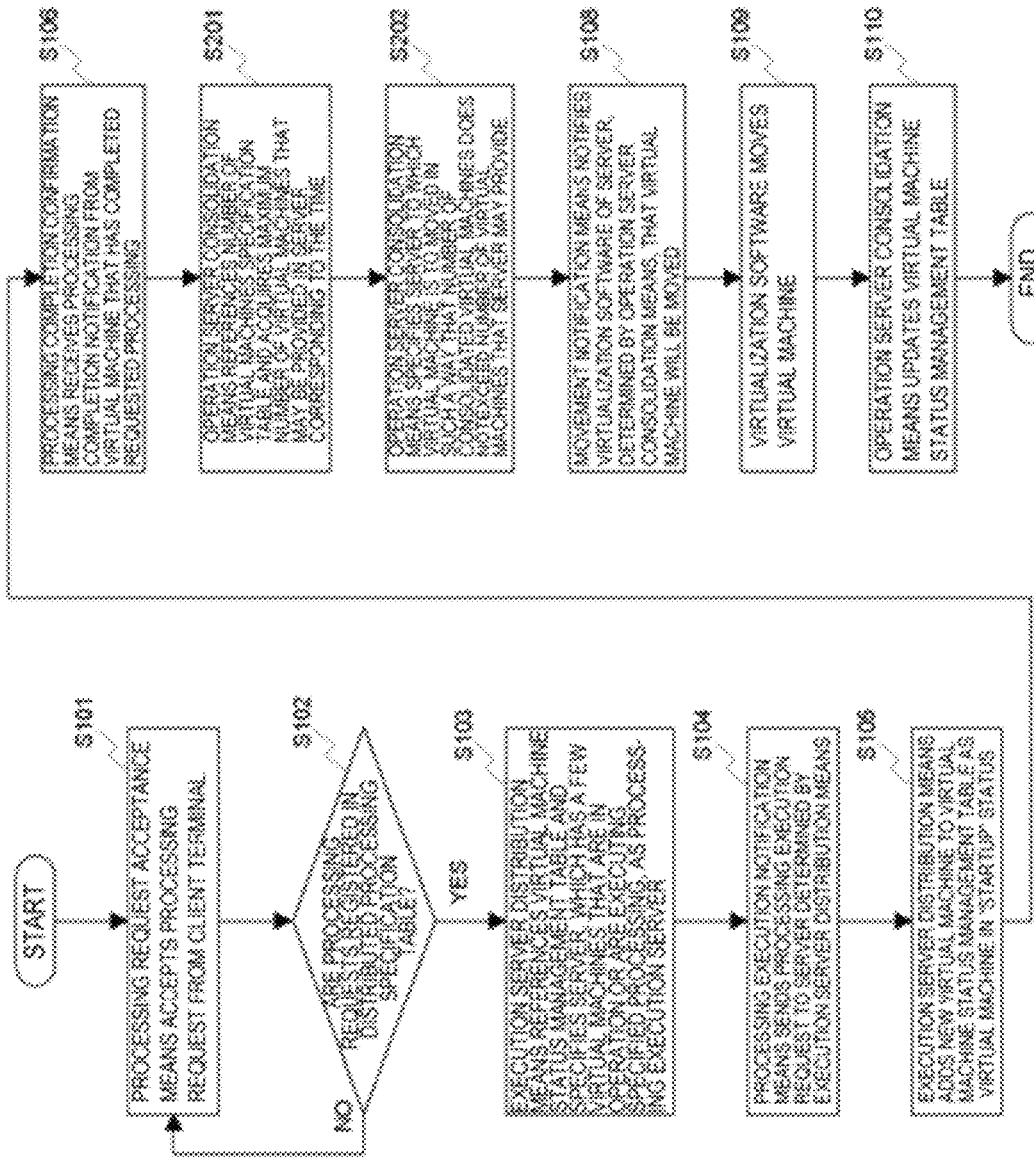
FIG. 10 is a flowchart showing the operation of the second exemplary embodiment of the present invention.

Next, the following describes the operation of the second exemplary embodiment with reference to the flowchart in FIG. 10.

Referring to FIG. 10, the operation of the second exemplary embodiment is similar to the operation of the first exemplary embodiment in FIG. 2 except that step S107 is replaced by steps S201 and S202. The following describes only steps S201 and S202 in which the operation different from that shown in FIG. 2 is performed.

In the operation from the start to step S106, the startup of a virtual machine is completed and its completion is confirmed.

Next, in step S201, operation server consolidation unit 16 references the number of virtual machines specification table 33 and acquires the maximum number of virtual machines configurable in the virtual machine providing servers 90 corresponding to the time.

Next, in step S202, the operation server consolidation unit 16 specifies a movement destination server in which the number of consolidated virtual machines does not exceed the number of virtual machines that the server may provide. If the values registered in the number of virtual machines specification table 33 are not the maximum number of virtual machines but the maximum usage amounts of resources, the operation server consolidation unit 16 specifies a movement destination server in which the resource usage amount of the consolidated virtual machines does not exceed the maximum resource usage amount.

After step S202 is terminated, the operation is executed in and after S108 in the same way as in the first exemplary embodiment.

Figure 11:
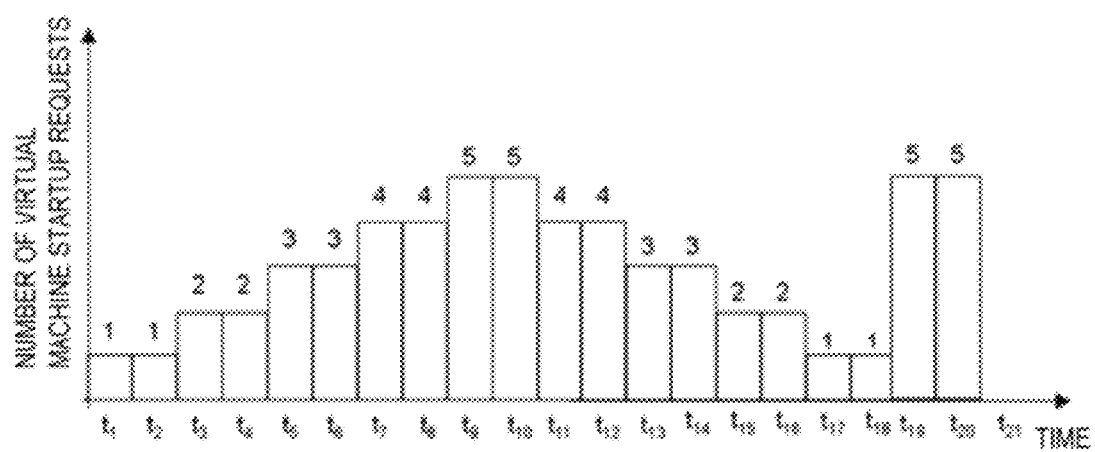
FIG. 11 is a diagram showing another example of a virtual machine startup pattern.

The following describes more in detail the operation performed when requests are issued as shown in the virtual machine request pattern in FIG. 11. The request pattern in FIG. 11 indicates that, after time t18 in the request pattern in FIG. 3, the requests each requesting the startup of five virtual machines are added at time t19 and time t20. In the description below, because the total number of virtual machines is increased by 10, it is assumed that two virtual machine providing servers 90 are added to increase the total number of virtual machine providing servers 90 to 12. FIG. 12 shows the relation between virtual machine providing servers 90 and virtual machines 91 at times t19 and t20.

From time t1 to time t18, the operation is the same as that in the first exemplary embodiment. The only difference is that, because the maximum number of virtual machines in each virtual machine providing server 90 is four from time t1 to time t16, the operation server consolidation unit 16 determines the arrangement of virtual machines 91 in step S202 with the maximum number of virtual machines in each virtual machine providing server 90 set to four. As a result, at the end of time t16, each of all 12 virtual machine providing servers 90 includes four virtual machines 91. At times t17 and t18, a request to start one virtual machine 91 is issued and, so, the startup and the operation of the virtual machine 91 are executed, respectively, in the virtual machine providing servers 90-1 and 90-2.

At time t19, a request to start five virtual machines is issued. Therefore, in step S103, the execution server distribution unit 13 selects five virtual machine providing servers (virtual machine providing servers 90-3 to 90-7 in the example in FIG. 12) from the virtual machine providing servers 90-3 to 90-12, which have free resources, to distribute the processing. At time t20, too, a request to start five virtual machines is issued. Therefore, in step S103, the execution server distribution unit 13 selects five virtual machine providing servers (virtual machine providing servers 90-8 to 90-12 in the example in FIG. 12) from the virtual machine providing servers 90-8 to 90-12, which have free resources, to distribute the processing.

Next, the following describes the effect of the second exemplary embodiment of the present invention.

In this exemplary embodiment, the number of virtual machines specification table 33 is provided to change the maximum number of virtual machines in the virtual machine providing servers 90 according to the time. The ability to change the maximum number of virtual machines in the virtual machine providing servers 90 according to the time allows the virtual machines 91 to be started with the load distributed even if there are multiple request peaks as at times t9 and t10 and times t19 and t20 in FIG. 11. This reduces the startup time of a virtual machine as compared with the first exemplary embodiment even if there are multiple peaks in the request pattern.

More specifically, when the virtual machine startup request pattern is as shown in FIG. 11, the resource usage status at the startup of virtual machines at times t19 and t20 in the first exemplary embodiment is as shown in FIG. 8, meaning that the resource usage amount of virtual machines at startup time is decreased and the startup takes time. On the other hand, the resource usage amount of the virtual machines at startup time in the second exemplary embodiment is larger than that in the first exemplary embodiment even at times t19 and t20 as shown in FIG. 12 with the result that the startup times of the virtual machines may be reduced.

Although the maximum number of virtual machines is equal among all virtual machine providing servers 90 in the example of the number of virtual machines specification table 33 in FIG. 9, different values may also be registered as the maximum number of virtual machines in the virtual machine providing servers 90. Different times may also be registered as times at which the maximum number of virtual machines is switched in the virtual machine providing servers 90.

The number of virtual machines specification table 33 may also store the maximum number of virtual machines, not for the times, but for the number of virtual machines in operation. In that case, the processing in step 201 in FIG. 10 is changed to the processing in which the operation server consolidation unit 16 references the virtual machine status management table 32, acquires the total number of existing virtual machines, and acquires the maximum number of virtual machines corresponding to the acquired total number of virtual machines from the number of virtual machines specification table 33.

The number of virtual machines specification table 33 may also store, not the maximum number of virtual machines in the virtual machine providing server 90, but the maximum usage rates of the resources in the virtual machine providing server 90, to allow the operation server consolidation unit 16 to consolidate virtual machines based on the resource usage rates.

Third Exemplary Embodiment

Next, a third exemplary embodiment of the present invention will be described in detail below with reference to the drawings.

Figure 13:
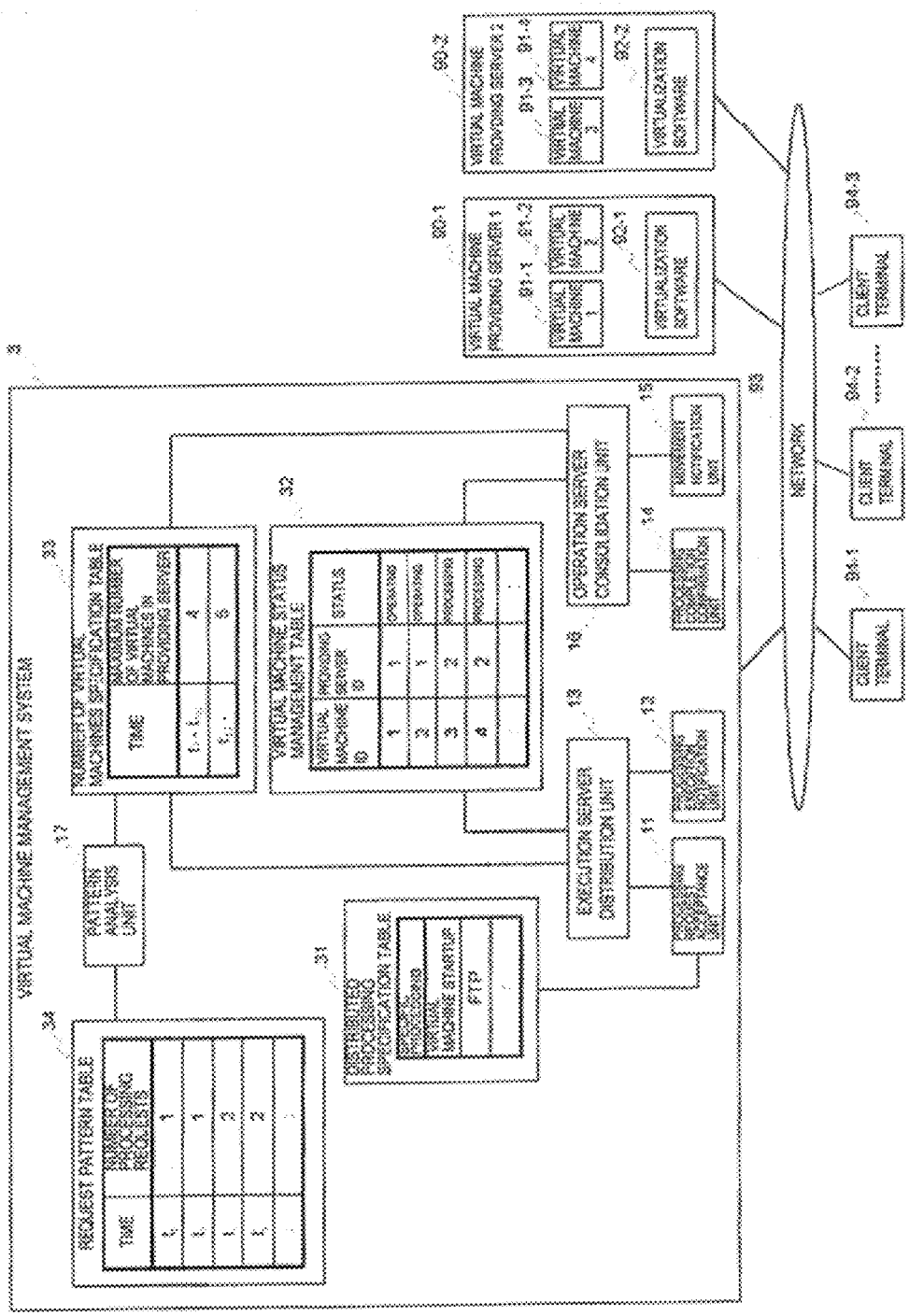
FIG. 13 is a block diagram showing the configuration of a third exemplary embodiment of the present invention.

Referring to FIG. 13, a computer system in the third exemplary embodiment of the present invention is similar to the computer system in the second exemplary embodiment shown in FIG. 9 except that the virtual machine management system 2 is replaced by a virtual machine management system 3. The virtual machine management system 3 differs from the virtual machine management system 2 in that it further comprises a request pattern table 34 and pattern analysis unit 17.

The request pattern table 34 indicates the request generation time distribution of special processing registered in the distributed processing specification table 31. The example of the request pattern table 34 in FIG. 13 indicates that the number of virtual machine startup requests at times t1, t2, t3, and t4 are 1, 1, 2, and 2, respectively. Such a request pattern table 34 may be created, for example, based on past request logs.

The pattern analysis unit 17 references the request pattern table 34 to create a number of virtual machines specification table 33 from the processing request distribution.

Figure 14:
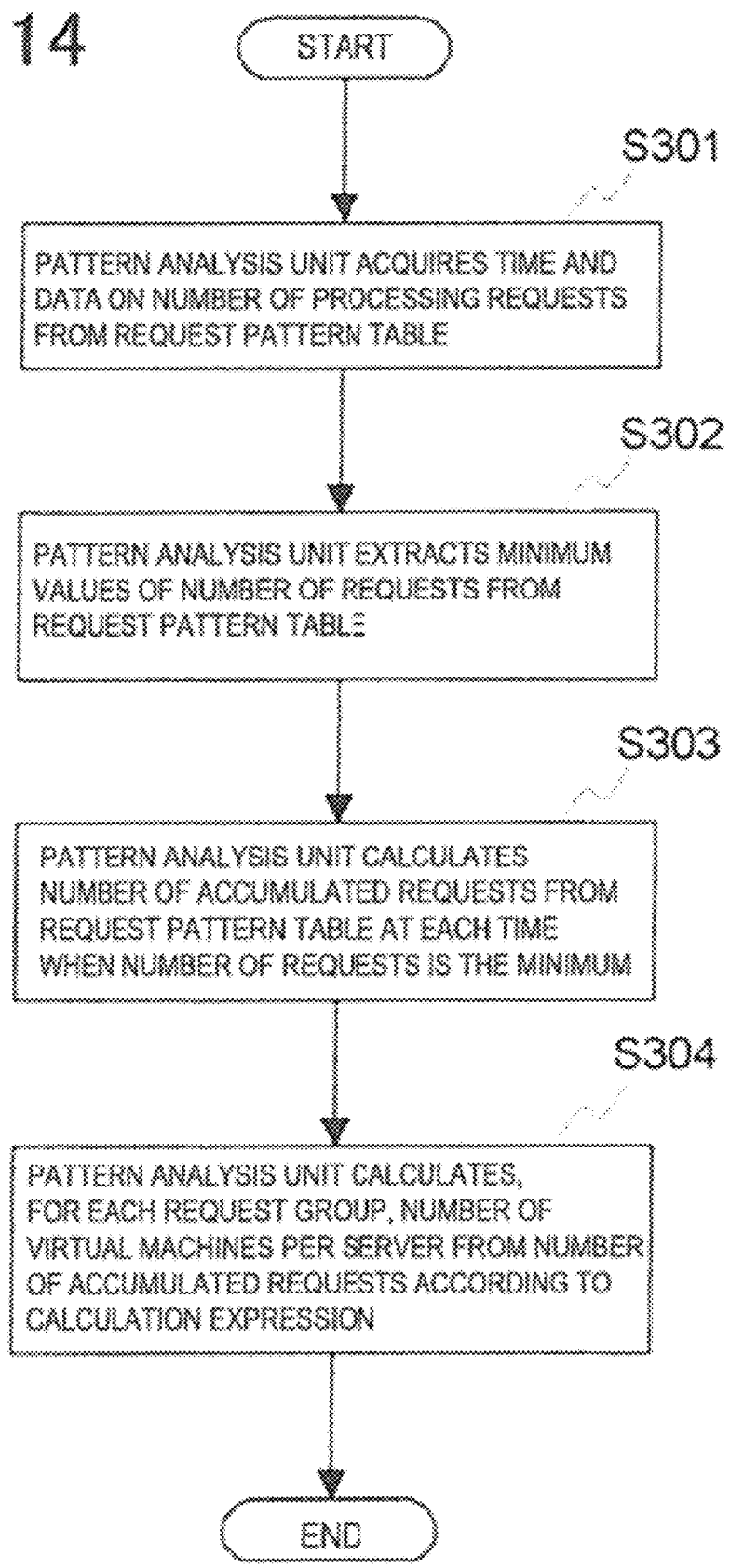
FIG. 14 is a flowchart showing the operation of the third exemplary embodiment of the present invention.

From the acceptance of a processing request to the creation and movement of virtual machines, the operation of the third exemplary embodiment is the same as the operation of the second exemplary embodiment described with reference to FIG. 10. In the third exemplary embodiment, the operation of the pattern analysis unit 17 to create the number of virtual machines specification table 33 is newly added. As an operation executed in the third exemplary embodiment, the following describes the operation of the pattern analysis unit 17 to create the number of virtual machines specification table 33 with reference to FIG. 14 and FIG. 15.

In step S301, the pattern analysis unit 17 acquires a time and data on the number of processing requests from the request pattern table 34.

In step S302, the pattern analysis unit 17 extracts the minimum values of the number of requests from the request pattern table 34. For example, in the case of the request pattern in FIG. 11, the pattern analysis unit 17 extracts the number of requests 1 at time t1, the number of requests 1 at time t17, and the number of requests 0 at time t21, as the minimum values.

Figure 15:
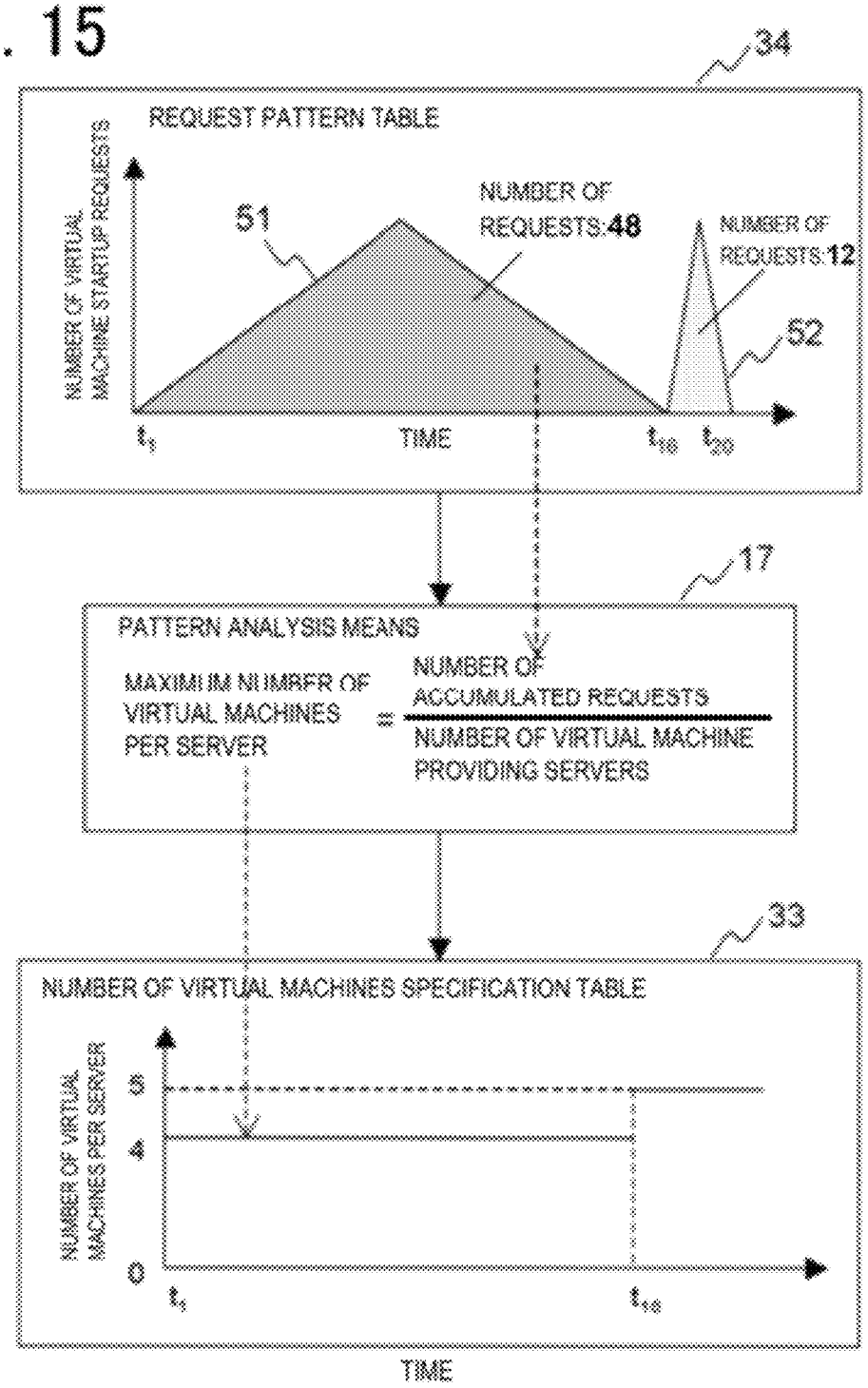
FIG. 15 is a diagram showing in detail the operation of the third exemplary embodiment of the present invention.

In step S303, the pattern analysis unit 17 calculates the number of accumulated requests from the request pattern table 34 at each time when the number of requests is the minimum. In the example in FIG. 11, the number of accumulated requests from time t1 to time t16 is 48 that is calculated as the number of requests of the request group 51 as shown in FIG. 15. Similarly, the number of accumulated requests at t21 is 60 that is calculated as the sum of the number of requests of request group 1 and that of request group 2.

In step S304, for the times extracted in step S302, the pattern analysis unit 17 calculates the number of virtual machines per server from the number of accumulated requests according to a calculation expression. For example, the calculation expression is (Maximum number of virtual machines per virtual machine providing server)=(Number of accumulated requests)/(Number of virtual machine providing servers) as shown in FIG. 15. For example, when the number of virtual machine providing servers is 12, the number of accumulated requests, 48, from time t1 to time 16 is divided by 12 to produce the answer, 4, that is the maximum number of virtual machines. At time t17 and later, the number of accumulated requests, 60, is divided by 12 to produce 5 that is the maximum number of virtual machines.

Next, the following describes the effect of the third exemplary embodiment of the present invention.

In the second exemplary embodiment described above, the maximum numbers of virtual machines must be registered in the number of virtual machines specification table 33 in advance. On the other hand, the pattern analysis unit 17 is able to create the number of virtual machines specification table 33 from the request pattern table 34 in the third exemplary embodiment, making it possible to automatically create the number of virtual machines specification table 33 simply by providing the request pattern table 34 that is easily acquired from the past logs.

The request pattern table 34 may be created using past request logs as well as the information on virtual machine startup. Because it is assumed that virtual machines are started immediately after employees come to the office, the employee's office entry record may also be used.

When the maximum values registered in the number of virtual machines specification table 33 are resource usage amounts, the pattern analysis unit 17 finds the minimum value of the number of processing requests from the request pattern table 34, calculates the number of requests accumulated to the time when the number of requests reaches the minimum value, and divides the sum of the amounts of in-use resources allocated to the number of accumulated requests by the number of virtual machine providing servers to produce an answer that is the maximum resource usage amount per virtual machine providing server at that time.

Fourth Exemplary Embodiment

Next, a fourth exemplary embodiment of the present invention will be described in detail with reference to the drawings.

Figure 16:
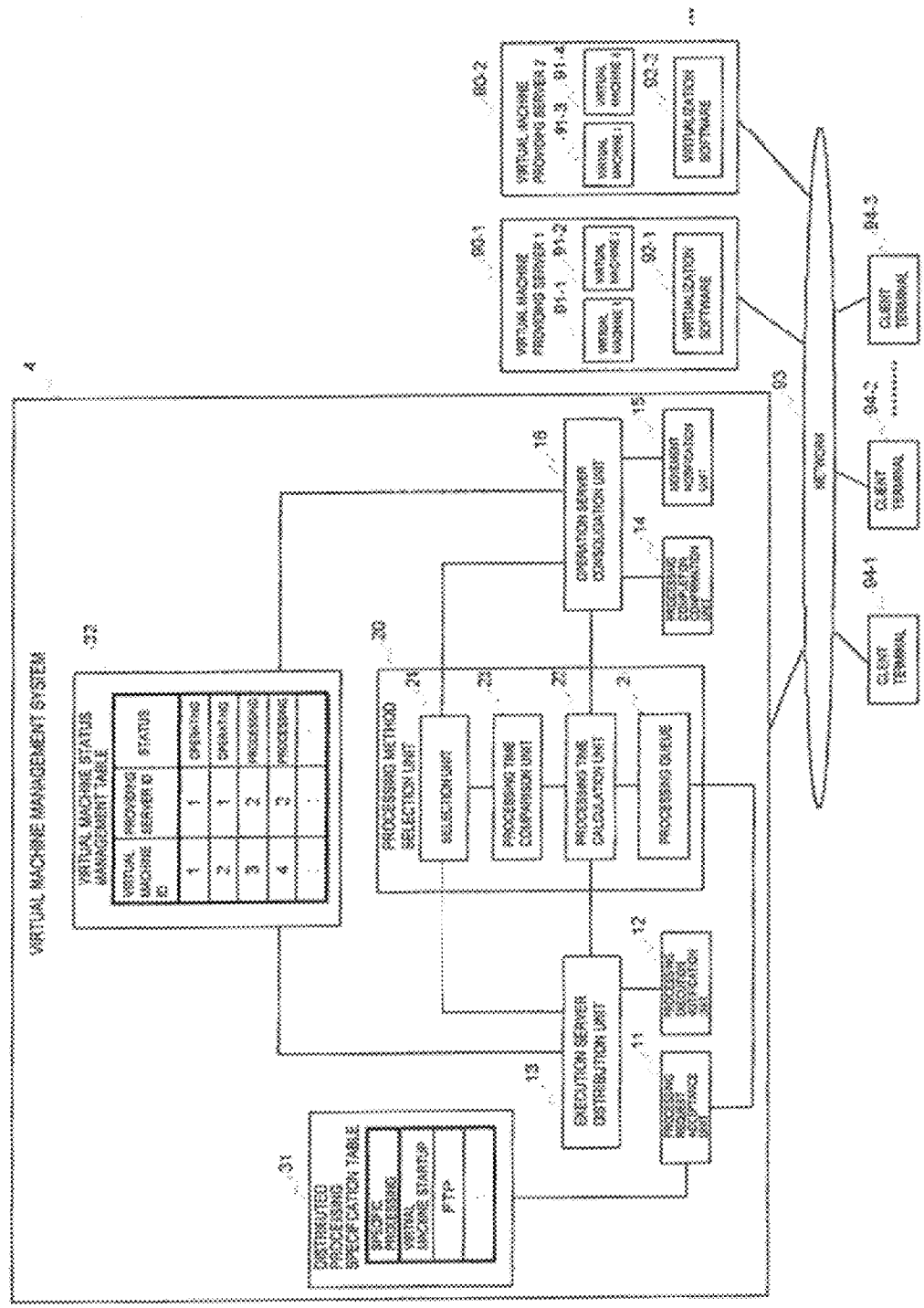
FIG. 16 is a block diagram showing the configuration of a fourth exemplary embodiment of the present invention.

Referring to FIG. 16, a computer system in the fourth exemplary embodiment of the present invention is similar to the computer system in the first exemplary embodiment shown in FIG. 1 except that the virtual machine management system 1 is replaced by a virtual machine management system 4. The virtual machine management system 4 differs from the virtual machine management system 1 in that it further comprises processing method selection unit 20.

The processing method selection unit 20 comprises a processing queue 21, processing time calculation unit 22, processing time comparison unit 23, and selection unit 24.

The processing queue 21 temporarily stores processing requests accepted by the processing request acceptance unit 11.

The processing time calculation unit 22 calculates the processing execution time required for the case in which the execution of all processing requests in the processing queue 21 is requested at a time and for the case in which the waiting processing requests are divided into multiple units for execution, one unit at a time. In addition, the processing requests may be divided into multiple processing request notification patterns, and the processing execution time is calculated for each of them. For example, when the processing queue 21 has six processing requests, the processing time may be calculated for each of multiple patterns such as a pattern in which six requests are issued at a time, three requests are issued twice, two requests are issued three times, or a different number of requests are issued each time (one request in the first time, two requests in the second time, and three requests in the third time). Another possible pattern is that the execution of virtual machine startup requests is serially requested in such a way that one virtual machine is always being started in the virtual machine providing servers. It is also possible to calculate the processing time separately for the case in which the processing of the operation server consolidation unit 16 is executed and for the case in which the processing of the operation server consolidation unit 16 is not executed.

The processing time comparison unit 23 compares the processing times of multiple processing request notification patterns calculated by the processing time calculation unit 22. For example, the processing time comparison unit 23 compares the average values of times required for a virtual machine to be started. The processing time comparison unit 23 may also compare the variations (variance) in virtual machine startup times or the worst values of virtual machine startup times.

The selection unit 24 selects a processing request notification pattern that has, for example, the minimum average of the times for a virtual machine to be started according to the comparison result of the processing time comparison unit 23. The processing time comparison unit 23 may also select a pattern that has the minimum variation (variance) in the virtual machine startup time or a pattern that minimizes the worst value of the virtual machine startup time.

Figure 17:
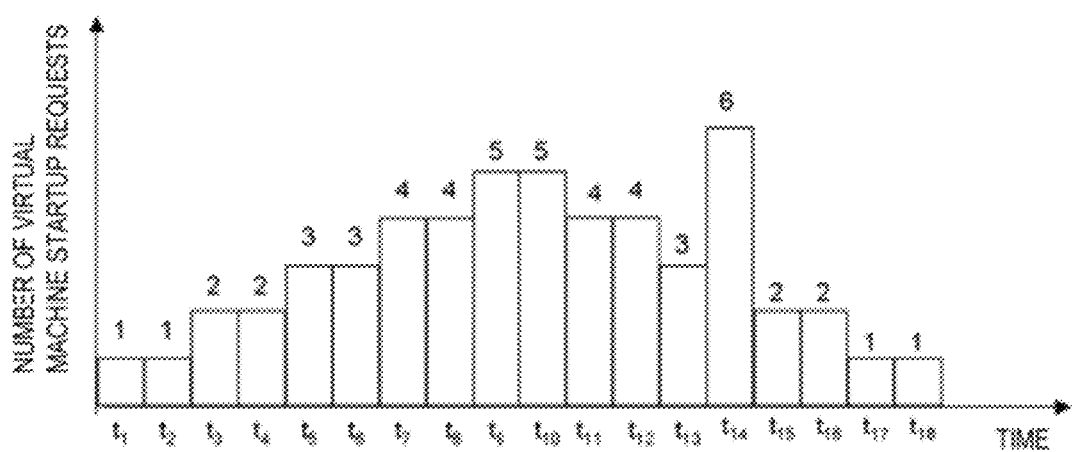
FIG. 17 is a diagram showing another example of a virtual machine startup pattern.
Figure 18:
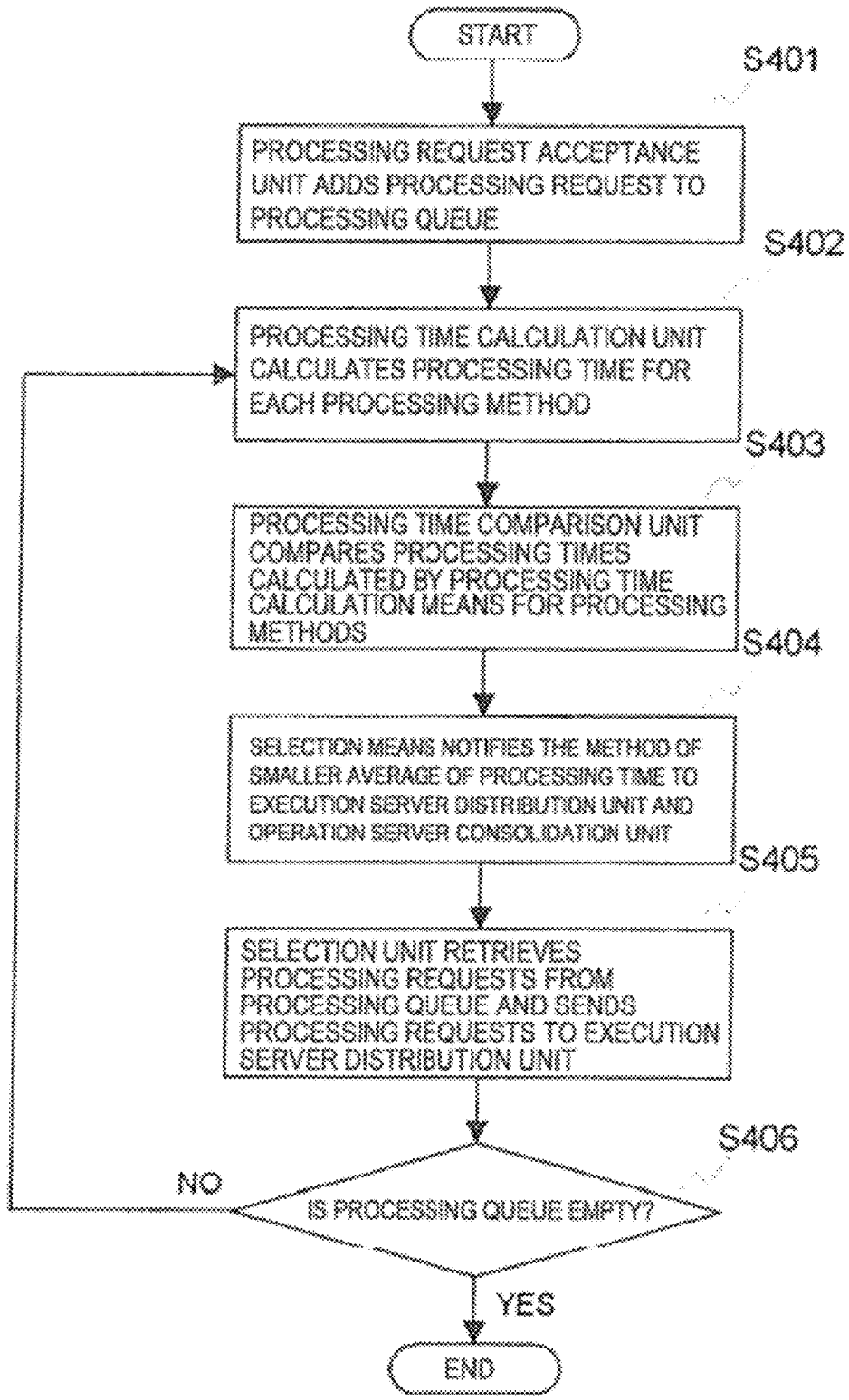
FIG. 18 is a flowchart showing the operation of the fourth exemplary embodiment of the present invention.
Figure 19:
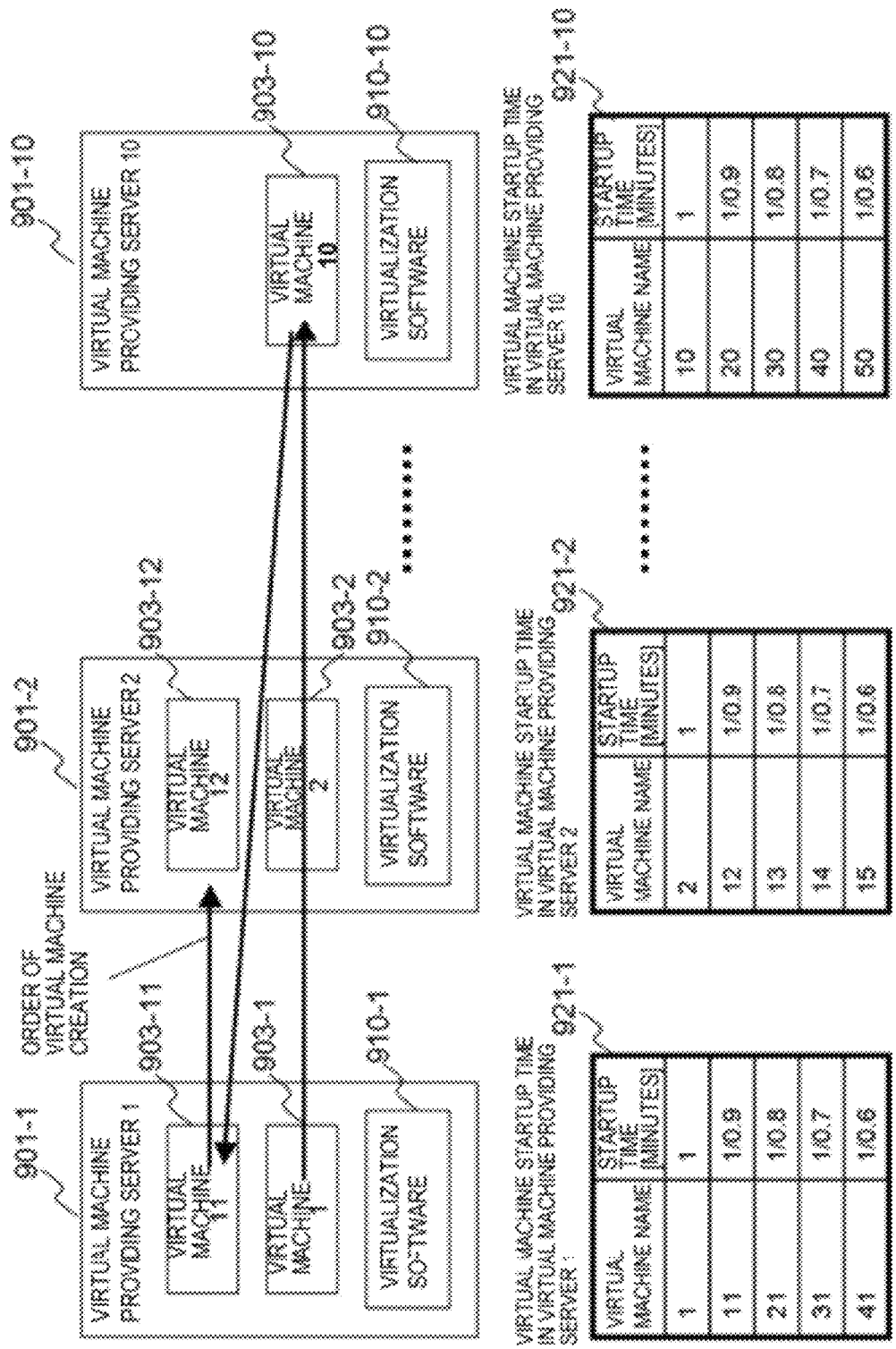
FIG. 19 is a diagram showing the operation of a technology related to the present invention.

Next, the following describes the operation of the fourth exemplary embodiment of the present invention with reference to FIG. 17 and FIG. 18. FIG. 17 is a diagram showing an example of a virtual machine startup request pattern. As compared with the pattern in FIG. 3, the pattern in FIG. 17 is characterized in that the number of requests is increased in a burst way at time t14.

FIG. 18 is a flowchart showing the operation of the fourth exemplary embodiment of the present invention. The following describes the general operation with reference to FIG. 18. At the same time, the following describes the specific operation at time t14 in FIG. 17.

In step S401, the processing request acceptance unit 11 adds processing requests to the processing queue 21. For example, at time t14 in FIG. 17, the processing request acceptance unit 11 adds six processing requests to the processing queue 21.

In step S402, the processing time calculation unit 22 calculates the processing time for each processing method. For example, assume that two startup times are calculated for the case at time t14 in FIG. 17, one for the case in which six requests are issued at a time and the other for the case in which virtual machine startup requests are issued serially so that the number of virtual machines being started in each virtual machine providing server is always one. At the start of t14, the status in FIG. 4 to FIG. 6 indicates that there is one operating virtual machine in the virtual machine providing server 90-9 at the start of the time slot of t14 and that there is no operating virtual machine in the virtual machine providing server 90-10. An attempt to process six requests at a time in this status would cause three virtual machines to be started in each of the virtual machine providing servers 90-9 and 90-10. The startup time in this case is calculated as follows. In the virtual machine providing server 90-9, 30% of resources may be used for each virtual machine and so the startup time is 3.3 minutes. In the virtual machine providing server 90-10, 33% of resources may be used for each virtual machine and so the startup time is 3.0 minutes. Therefore, the average of the virtual machine startup times of the six virtual machines is 3.15 minutes.

On the other hand, when virtual machine startup requests are serially processed, the first two virtual machines are started, one at a time, in virtual machine providing servers 90-9 and 90-10 and use 90% of resources and 100% of resources, respectively. The startup times are therefore 1.1 minutes and 1 minute, respectively. The next two virtual machines are also started, one at a time, in virtual machine providing servers 90-9 and 90-10 after the previous virtual machine is started and moved and use 80% of resources and 90% of resources, respectively. The startup times are therefore 1.3 minutes and 1.1 minutes, respectively. The required times, including the time stored in the processing queue 21, are 2.4 minutes and 2.1 minutes. The last two virtual machines are also started, one at a time, in virtual machine providing servers 90-9 and 90-10, and use 70% of resources and 80% of resources, respectively. The startup times are therefore 1.4 minutes and 1.3 minutes, respectively. The required times, including the time stored in the processing queue 21, are 3.8 minutes and 3.4 minutes. When requests are once stored in the processing queue 21 and are serially processed in this way, the average startup time of the six virtual machine startup requests accepted at time t14 is calculated as 2.3 minutes. The time required for moving virtual machines, though ignored in the above description, must be considered to increase accuracy.

In step S403, the processing time comparison unit 23 compares the processing times calculated by the processing time calculation unit 22 for the processing methods. For example, the processing time comparison unit 23 compares the average time of the virtual machine startup time at time t14 in FIG. 17 between the case in which the six requests are processed at a time and the case in which the requests are processed serially. Assume that the average startup time of the serial processing is shorter as a result of the comparison.

In step S404, the selection unit 24 notifies the method of the smaller average of the processing time to the execution server distribution unit 13 and the operation server consolidation unit 16. For example, at time t14 in FIG. 17, the selection unit 24 selects the method which makes the average startup time shorter and which stores requests in the processing queue 21 before they are serially processed.

In step S405, the selection unit 24 retrieves processing requests from the processing queue 21 and sends the processing requests to the execution server distribution unit 13. For example, because the serial processing method is selected at time t14 in FIG. 17, the selection unit 24 first retrieves two processing requests from the processing queue 21 and sends them to the execution server distribution unit 13 as processing requests. After that, too, the selection unit 24 continues to retrieve processing requests from the processing queue 21 and sends them to the execution server distribution unit 13 as processing requests.

In step S406, a check is made if the processing queue 21 is empty. If the processing queue 21 still includes request processing, the operation is repeated from step S402. If the processing queue 21 is empty, the processing request acceptance unit waits for a processing request to arrive in step S401 again. For example, six processing requests are registered in the processing queue 21 at the start of the time slot at time t14 in FIG. 17. Each time the processing completion confirmation unit 14 confirms that the startup of a virtual machine is terminated, a check is made if the processing queue 21 is empty and, if the processing queue 21 includes processing, step S402 and the following steps are executed again.

Next, the following describes the effect of the fourth exemplary embodiment of the present invention.

When processing requests are accepted in a burst manner, for example, at time t14 in FIG. 17, the free resources are divided for use by multiple requests for their execution and so, in the first exemplary embodiment described above, the processing time for all processing becomes sometimes longer. In contrast, in the fourth exemplary embodiment, the processing method selection unit 20 stores processing requests temporarily in the processing queue 21, calculates the processing times for the processing methods, compares the calculated processing times for selecting a method whose processing time is shorter, and retrieves the number of processing requests from the processing queue 21 according to the selected method, thus reducing the average value of the processing time. The processing queue 21 in which processing requests are temporarily stored, if provided as in the fourth exemplary embodiment, allows processing requests to be put in the wait status even if requests are received at a time as in the batch processing, making the present invention applicable to such a case.

In the first exemplary embodiment to the fourth exemplary embodiment, the virtual machine management systems 1-4 have been described that they operate on a computer separate from the virtual machine providing server 90. However, because the effect of the present invention is not characterized in the execution on separate computers, the same effect as that described above may be achieved even if the virtual machine management system operates in the virtual machine 91 on the virtual machine providing server 90 or in the virtualization software 92.

The first exemplary embodiment to the fourth exemplary embodiment may be combined to provide a virtual machine management system having the effect of those exemplary embodiments.

Another effect of the present invention is that a reduction in the number of virtual machines executing special processing at any point in time leads to a reduction in the number of virtual machines that are affected at a failure time.

While the present invention has been described with reference to the exemplary embodiments above, it is to be understood that the present invention is not limited to the exemplary embodiments above and that modifications and changes that may be made by those skilled in the art within the scope the present invention described in the claims of this application are included.

The exemplary embodiments and the examples may be changed and adjusted in the scope of the entire disclosure (including claims) of the present invention and based on the basic technological concept thereof. In the scope of the claims of the present invention, various disclosed elements may be combined and selected in a variety of ways.

Mode 1

In the following, preferred modes are summarized. (refer to the virtual machine managing device of the first aspect).

Mode 2

The virtual machine managing device as defined by mode 1 wherein the specific processing has a high processing load.

Mode 3

The virtual machine managing device as defined by mode 1 or 2, further comprising a processing queue that temporarily stores accepted requests for the special processing; processing time calculation means that calculates processing times for a plurality of predetermined processing methods for processing requests stored in the processing queue; processing time comparison means that compares the processing times of the processing methods calculated by the processing time calculation means; and selection means that selects a processing method based on the comparison result produced by the processing time comparison means.

Mode 4

The virtual machine managing device as defined by one of modes 1-3 wherein the execution server distribution means selects a virtual machine providing server, which has a minimum resource usage rate, as a processing execution server.

Mode 5

The virtual machine managing device as defined by one of modes 1-3 wherein the execution server distribution means selects a virtual machine providing server, which has a smallest number of operating virtual machines, as a processing execution server.

Mode 6

The virtual machine managing device as defined by one of modes 1-5 wherein the operation server consolidation means selects a movement destination virtual machine providing server of a virtual machine, which has terminated the special processing, in such a way that a number of virtual machine providing servers having no virtual machine therein is maximized in a scope in which a resource usage rate of each virtual machine providing server does not exceed a predefined maximum value.

Mode 7

The virtual machine managing device as defined by one of modes 1-5 wherein the operation server consolidation means selects a movement destination virtual machine providing server of a virtual machine, which has terminated the special processing, in such a way that a number of virtual machine providing servers having no virtual machine therein is maximized in a scope in which a number of virtual machines in each virtual machine providing server does not exceed a predefined maximum value.

Mode 8

The virtual machine managing device as defined by one of modes 1-7, further comprising a number of virtual machines specification table in which a maximum amount of resources usable by each virtual machine providing server is registered on a time basis wherein the operation server consolidation means references the number of virtual machines specification table and selects a movement destination virtual machine providing server of a virtual machine, which has terminated the special processing, in such a way that a number of virtual machine providing servers having no virtual machine therein is maximized in a scope in which a maximum resource value defined for each virtual machine providing server is not exceeded.

Mode 9

The virtual machine managing device as defined by one of modes 1-7, further comprising a number of virtual machines specification table in which a maximum number of virtual machines that may be provided in each virtual machine providing server is registered on a time basis wherein the operation server consolidation means references the number of virtual machines specification table and selects a movement destination virtual machine providing server of a virtual machine, which has terminated the special processing, in such a way that a number of virtual machine providing servers having no virtual machine therein is maximized in a scope in which a number of virtual machines defined for each virtual machine providing server is not exceeded.

Mode 10

The virtual machine managing device as defined by mode 8, further comprising a request pattern table that indicates a request generation time distribution of the special processing; and pattern analysis means that creates the number of virtual machines specification table that matches the time distribution indicated by the request pattern table.

Mode 11

The virtual machine managing device as defined by mode 10 wherein the pattern analysis means finds a minimum value of a number of processing requests from the request pattern table, calculates a number of accumulated requests to a time the number of processing requests reaches the minimum value, and registers an answer, produced by dividing a sum of amounts of in-use resources allocated to the number of accumulated requests by a number of virtual machine providing servers, in the number of virtual machines specification table as a maximum resource usage amount per virtual machine providing server at the time.

Mode 12

The virtual machine managing device as defined by mode 8, further comprising a request pattern table that indicates a request generation time distribution of the special processing; and pattern analysis means that creates the number of virtual machines specification table that matches the time distribution indicated by the request pattern table.

Mode 13

The virtual machine managing device as defined by mode 12 wherein the pattern analysis means finds a minimum value of a number of processing requests from the request pattern table, calculates a number of accumulated requests to a time the number of processing requests reaches the minimum value, and registers an answer, produced by dividing the number of accumulated requests by a number of virtual machine providing servers, in the number of virtual machines specification table as a maximum number of virtual machines per virtual machine providing server at the time.

Mode 14

(refer to the virtual machine managing method of the second aspect). The virtual machine managing method is feasible on the virtual machine managing device of the first aspect and is tied to the device.

Mode 15

The virtual machine managing method as defined by mode 14, further comprising a processing method selection step in which accepted requests for the special processing are temporarily stored in a processing queue, processing times are calculated for a plurality of predetermined processing methods for processing requests stored in the processing queue, the calculated processing times of the processing methods are compared, and a processing method is selected based on the comparison result.

Mode 16

The virtual machine managing method as defined by mode 14 or 15 wherein, in the execution server distribution step, a virtual machine providing server, which has a minimum resource usage rate, is selected as a processing execution server.

Mode 17

The virtual machine managing method as defined by mode 14 or 15 wherein, in the execution server distribution step, a virtual machine providing server, which has a smallest number of operating virtual machines, is selected as a processing execution server.

Mode 18

The virtual machine managing method as defined by one of modes 14-17 wherein, in the operation server consolidation step, a movement destination virtual machine providing server of a virtual machine, which has terminated the special processing, is selected in such a way that a number of virtual machine providing servers having no virtual machine therein is maximized in a scope in which a resource usage rate of each virtual machine providing server does not exceed a predefined maximum value.

Mode 19

The virtual machine managing method as defined by one of modes 14-17 wherein, in the operation server consolidation step, a movement destination virtual machine providing server of a virtual machine, which has terminated the special processing, is selected in such a way that a number of virtual machine providing servers having no virtual machine therein is maximized in a scope in which a number of virtual machines in each virtual machine providing server does not exceed a predefined maximum value.

Mode 20

The virtual machine managing method as defined by one of modes 14-19, wherein, in the operation server consolidation step, a number of virtual machines specification table, in which a maximum amount of resources usable by each virtual machine providing server is stored on a time basis, is referenced and a movement destination virtual machine providing server of a virtual machine, which has terminated the special processing, is selected in such a way that a number of virtual machine providing servers having no virtual machine therein is maximized in a scope in which a maximum resource value defined for each virtual machine providing server is not exceeded.

Mode 21

The virtual machine managing method as defined by one of modes 14-19, wherein, in the operation server consolidation step, a number of virtual machines specification table, in which a maximum number of virtual machines that may be provided in each virtual machine providing server is stored on a time basis, is referenced, a movement destination virtual machine providing server of a virtual machine, which has terminated the special processing, is selected in such a way that a number of virtual machine providing servers having no virtual machine therein is maximized in a scope in which a number of virtual machines defined for each virtual machine providing server is not exceeded.

Mode 22

The virtual machine managing method as defined by mode 20, further comprising a pattern analysis step in which a request pattern table, which indicates a request generation time distribution of the special processing, is referenced to create the number of virtual machines specification table that matches the time distribution.

Mode 23

The virtual machine managing method as defined by mode 21 wherein, in the pattern analysis step, a minimum value of a number of processing requests is obtained from the request pattern table, a number of accumulated requests to a time the number of processing requests reaches the minimum value is calculated, and an answer, produced by dividing a sum of amounts of in-use resources allocated to the number of accumulated requests by a number of virtual machine providing servers, is registered in the number of virtual machines specification table as a maximum resource usage amount per virtual machine providing server at the time.

Mode 24

The virtual machine managing method as defined by mode 21, further comprising a pattern analysis step in which a request pattern table, which indicates a request generation time distribution of the special processing, is referenced to create the number of virtual machines specification table that matches the time distribution.

Mode 25

The virtual machine managing method as defined by mode 24 wherein, in the pattern analysis step, a minimum value of a number of processing requests is obtained from the request pattern table, a number of accumulated requests to a time the number of processing requests reaches the minimum value is calculated, and an answer, produced by dividing the number of accumulated requests by a number of virtual machine providing servers, is registered in the number of virtual machines specification table as a maximum number of virtual machines per virtual machine providing server at the time.

Mode 26

(refer to the program of the third aspect). This program is recordable or storable onto a recording medium which is readable by a computer.

Mode 27

The virtual machine managing program as defined by mode 26, further causing the computer to function as a processing queue that temporarily stores accepted requests for the special processing; processing time calculation means that calculates processing times for a plurality of predetermined processing methods for processing requests stored in the processing queue; processing time comparison means that compares the processing times of the processing methods calculated by the processing time calculation means; and selection means that selects a processing method based on the comparison result produced by the processing time comparison means.

Mode 28

The virtual machine managing program as defined by mode 26 or 27 wherein the execution server distribution means selects a virtual machine providing server, which has a minimum resource usage rate, as a processing execution server.

Mode 29

The virtual machine managing program as defined by mode 26 or 27 wherein the execution server distribution means selects a virtual machine providing server, which has a smallest number of operating virtual machines, as a processing execution server.

Mode 30

The virtual machine managing program as defined by one of modes 26-29 wherein the operation server consolidation means selects a movement destination virtual machine providing server of a virtual machine, which has terminated the special processing, in such a way that a number of virtual machine providing servers having no virtual machine therein is maximized in a scope in which a resource usage rate of each virtual machine providing server does not exceed a predefined maximum value.

Mode 31

The virtual machine managing program as defined by one of modes 26-29 wherein the operation server consolidation means selects a movement destination virtual machine providing server of a virtual machine, which has terminated the special processing, in such a way that a number of virtual machine providing servers having no virtual machine therein is maximized in a scope in which a number of virtual machines in each virtual machine providing server does not exceed a predefined maximum value.

The invention claimed is:

1. A virtual machine managing device comprising:
hardware including a processor;
virtual machine status management unit implemented at least by the hardware and that manages a load status of a plurality of virtual machine providing servers which are connected to a network and each of which is able to operate virtual machines therein;
execution server distribution unit implemented at least by the hardware and that references data, managed by said virtual machine status management unit, and distributes predefined specific processing among low-load virtual machine providing servers for execution;
operation server consolidation unit implemented at least by the hardware and that references data, managed by said virtual machine status management unit, and moves virtual machines, which have terminated the specific processing, to separate the virtual machine providing servers into virtual machine providing servers, in which many virtual machines are consolidated, and other virtual machine providing servers;

a number of virtual machines specification table in which a maximum amount of resources usable by each virtual machine providing server is registered on a time basis wherein said operation server consolidation unit references said number of virtual machines specification table and selects a movement destination virtual machine providing server of a virtual machine, which has terminated the special processing, in such a way that a number of virtual machine providing servers having no virtual machine therein is maximized in a scope in which a maximum resource value defined for each virtual machine providing server is not exceeded;

further comprising a request pattern table that indicates a request generation time distribution of the special processing; and pattern analysis unit implemented at least by the hardware and that creates said number of virtual machines specification table that matches the time distribution indicated by said request pattern table.

2. The virtual machine managing device as defined by claim 1 wherein said pattern analysis unit finds a minimum value of a number of processing requests from said request pattern table, calculates a number of accumulated requests to a time the number of processing requests reaches the minimum value, and registers an answer, produced by dividing a sum of amounts of in-use resources allocated to the number of accumulated requests by a number of virtual machine providing servers, in said number of virtual machines specification table as a maximum resource usage amount per virtual machine providing server at the time.

3. A virtual machine managing device comprising:
hardware including a processor;
virtual machine status management unit implemented at least by the hardware and that manages a load status of a plurality of virtual machine providing servers which are connected to a network and each of which is able to operate virtual machines therein;
execution server distribution unit implemented at least by the hardware and that references data, managed by said virtual machine status management unit, and distributes predefined specific processing among low-load virtual machine providing servers for execution;
operation server consolidation unit implemented at least by the hardware and that references data, managed by said virtual machine status management unit, and moves virtual machines, which have terminated the specific processing, to separate the virtual machine providing servers into virtual machine providing servers, in which many virtual machines are consolidated, and other virtual machine providing servers;
a number of virtual machines specification table in which a maximum number of virtual machines that may be provided in each virtual machine providing server is registered on a time basis wherein said operation server consolidation unit references said number of virtual machines specification table and selects a movement destination virtual machine providing server of a virtual machine, which has terminated the special processing, in such a way that a number of virtual machine providing servers having no virtual machine therein is maximized in a scope in which a number of virtual machines defined for each virtual machine providing server is not exceeded;
a request pattern table that indicates a request generation time distribution of the special processing; and
pattern analysis unit that implemented at least by the hardware and creates said number of virtual machines specification table that matches the time distribution indicated by said request pattern table.

4. The virtual machine managing device as defined by claim 3 wherein said pattern analysis unit finds a minimum value of a number of processing requests from said request pattern table, calculates a number of accumulated requests to a time the number of processing requests reaches the minimum value, and registers an answer, produced by dividing the number of accumulated requests by a number of virtual machine providing servers, in said number of virtual machines specification table as a maximum number of virtual machines per virtual machine providing server at the time.

* * * * *